(12) United States Patent
Park et al.

(10) Patent No.: US 10,330,846 B2
(45) Date of Patent: *Jun. 25, 2019

(54) LIGHT GUIDE PANEL, BACKLIGHT UNIT, AND LIQUID CRYSTAL DISPLAY

(71) Applicant: Samsung Display Co. Ltd., Yongin, Gyeonggi-Do (KR)

(72) Inventors: Se Ki Park, Hwaseong-si (KR); Sang Woo Ha, Yongin-si (KR); Jun Woo You, Seongnam-si (KR); Ha Young Lee, Seoul (KR); Yu Dong Kim, Suwon-si (KR); Dong Yeol Yeom, Suwon-si (KR); Seung Hwan Chung, Asan-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,914

(22) Filed: Aug. 29, 2018

(65) Prior Publication Data

US 2018/0372942 A1    Dec. 27, 2018

Related U.S. Application Data

(62) Division of application No. 14/262,772, filed on Apr. 27, 2014, now Pat. No. 10,088,621.

(30) Foreign Application Priority Data

Dec. 17, 2013  (KR) .......................... 10-2013-0157297
Mar. 17, 2014  (KR) .......................... 10-2014-0031010

(51) Int. Cl.
*F21V 8/00*  (2006.01)

(52) U.S. Cl.
CPC .......... *G02B 6/0036* (2013.01); *G02B 6/0053* (2013.01)

(58) Field of Classification Search
CPC .......................... G02B 6/0036; G02B 6/0053
(Continued)

(56) References Cited

U.S. PATENT DOCUMENTS 5,718,497 A  2/1998 Yokoyama .......... G02B 6/0036
                                                362/23.15
6,454,452 B1  9/2002 Sasagawa et al.
(Continued)

FOREIGN PATENT DOCUMENTS

JP    10-227918 A    8/1998
JP    2009122637     6/2009
(Continued)

*Primary Examiner* — Anh T Mai
*Assistant Examiner* — Jessica M Apenteng
(74) *Attorney, Agent, or Firm* — Cantor Colburn LLP

(57) ABSTRACT

A light guide panel includes a top surface configured to have first and second sides extending in X- and Y-axis directions, respectively, a bottom surface configured to be disposed opposite to the top surface, and includes a base surface, and a plurality of diffusion patterns which is provided to protrude from, or to be recessed into, the base surface, and each of the plurality of diffusion patterns including a first inclined surface which defines a first inclination angle with the base surface and a second inclined surface which adjoins the first inclined surface and defines a second inclination angle with the base surface, and a first side surface and a second side surface configured to be disposed between the top surface and the bottom surface and face each other, where the first inclination angle ranges from about 1.8 degrees to about 5.7 degrees.

7 Claims, 64 Drawing Sheets

(58) Field of Classification Search
USPC .......................................................... 362/625
See application file for complete search history.

(56) References Cited

U.S. PATENT DOCUMENTS

| | | | |
|---|---|---|---|
| 7,507,011 B2 | 3/2009 | Ueno et al. | |
| 7,796,213 B2 | 9/2010 | Shiraishi | G02B 6/0038 349/65 |
| 7,859,759 B2 | 12/2010 | Coyle et al. | |
| 2006/0133113 A1 | 6/2006 | Koike et al. | |
| 2007/0030698 A1 | 2/2007 | Miyashita | G02B 6/0038 362/626 |
| 2009/0021668 A1 | 1/2009 | Cheng | G02B 6/0036 349/65 |
| 2009/0286446 A1 | 11/2009 | Kamikatano et al. | |
| 2010/0178613 A1 | 7/2010 | Hwang et al. | |
| 2011/0299013 A1 | 12/2011 | Ishida | G02B 6/0038 349/65 |

FOREIGN PATENT DOCUMENTS

| | | |
|---|---|---|
| JP | 2013187059 A | 9/2013 |
| JP | 2013191514 A | 9/2013 |
| JP | 2013206834 A | 10/2013 |
| WO | 2012111190 A1 | 7/2014 |

LIGHT GUIDE PANEL, BACKLIGHT UNIT, AND LIQUID CRYSTAL DISPLAY

This application is a divisional application of U.S. application Ser. No. 14/262,772 filed Apr. 27, 2014, which claims priority to Korean Patent Application No. 10-2013-0157297, filed on Dec. 17, 2013 and Korean Patent Application No. 10-2014-0031010 filed on Mar. 17, 2014 and all the benefits accruing therefrom under 35 U.S.C. § 119, the disclosure of which is incorporated herein by reference in its entirety.

BACKGROUND

1. Field

The invention relates to a light guide panel, a backlight unit ("BLU") and a liquid crystal display ("LCD") including the BLU, and more particularly, to a light guide panel, a BLU and an LCD including the BLU, which are capable of inducing a forward emission of light.

2. Description of the Related Art

A liquid crystal display ("LCD") includes an LCD module connected to an exterior case. The LCD module includes a liquid crystal panel having two substrates and a liquid crystal layer interposed between the two substrates, and a backlight assembly disposed at a rear of the liquid crystal panel and applying light to the liquid crystal layer. The liquid crystal panel displays an image by adjusting transmittance of light provided thereto by the backlight assembly.

The backlight assembly may be classified as a direct type or an edge type, depending on a position of a light source with respect to a display panel. In a direct-type backlight assembly, a light source is disposed at the rear of a display panel, whereas in an edge-type backlight assembly, a light source is disposed at one side of the rear of a display panel.

An edge-type backlight assembly needs a light guide panel for guiding light emitted by a light source toward a display panel. The light guide panel changes a path of light so as to guide the light toward the display panel. It has become an important task for an LCD to concentrate light emitted in various directions and guide the concentrated light to travel forward, i.e., toward a display panel, and as a result, various attempts have been made to improve the brightness of light emitted forward from an LCD.

SUMMARY

Exemplary embodiments of the invention provide a light guide panel capable of providing an excellent forward-emitted light brightness.

Exemplary embodiments of the invention also provide a backlight unit ("BLU") capable of providing an excellent forward-emitted light brightness.

Exemplary embodiments of the invention also provide a liquid crystal display ("LCD") capable of providing an excellent forward-emitted light brightness.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a light guide panel includes a top surface, which has first and second sides that extend in X- and Y-axis directions, respectively, a bottom surface, which is disposed opposite to the top surface, and a first side surface and a second side surface which are disposed between the top surface and the bottom surface and face each other. The bottom surface includes a base surface and a plurality of diffusion patterns which is provided to protrude from, or to be recessed into, the base surface. Each of the diffusion patterns includes a first inclined surface which defines a first inclination angle with the base surface and a second inclined surface which adjoins the first inclined surface and defines a second inclination angle $\alpha$ with the base surface.

According to another exemplary embodiment of the invention, a BLU includes a light guide panel, and the light guide panel includes a top surface, which has first and second sides that extend in X- and Y-axis directions, respectively, a bottom surface, which is disposed opposite to the top surface, and a first side surface and a second side surface which are disposed between the top surface and the bottom surface and face each other, where the bottom surface includes a base surface and a plurality of diffusion patterns which is provided to protrude from, or to be recessed into, the base surface, and each of the diffusion patterns includes a first inclined surface which defines a first inclination angle with the base surface and a second inclined surface which adjoins the first inclined surface and defines a second inclination angle with the base surface. The BLU also includes a light source unit which is disposed near the first side surface of the light guide panel, and a prism sheet which is disposed opposite to the top surface of the light guide panel and includes a plurality of prisms.

According to another exemplary embodiment of the invention, an LCD includes a BLU and a display panel disposed on the BLU. The BLU includes a light guide panel, and the light guide panel includes a top surface, which has first and second sides that extend in X- and Y-axis directions, respectively, a bottom surface, which is disposed opposite to the top surface, and a first side surface and a second side surface which are disposed between the top surface and the bottom surface and face each other, where the bottom surface includes a base surface and a plurality of diffusion patterns which is provided to protrude from, or to be recessed into, the base surface, and each of the diffusion patterns includes a first inclined surface which defines a first inclination angle with the base surface and a second inclined surface which adjoins the first inclined surface and defines a second inclination angle $\alpha$ with the base surface. The BLU also includes a light source unit which is disposed near the first side surface of the light guide panel, and a prism sheet which is disposed opposite to the top surface of the light guide panel and includes a plurality of prisms.

According to embodiments, it is possible to guide light emitted from a light source unit to travel forward to the front of a display device and thus to improve the brightness of light emitted forward.

In addition, it is possible to provide a BLU and an LCD having improved forward-emitted light brightness properties.

Other features and exemplary embodiments may be apparent from the following detailed description, the drawings, and the claims.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
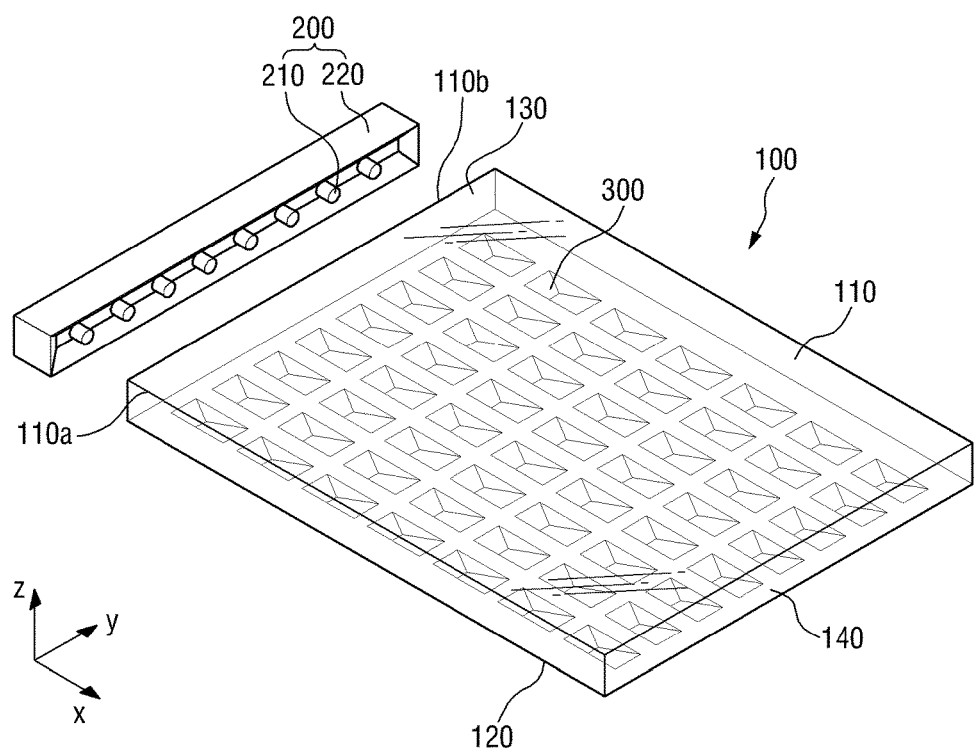
FIG. 1 is a perspective view of an exemplary embodiment of a light guide panel according to the invention.

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The exemplary embodiments and features of the invention and methods for achieving the exemplary embodiments and features will be apparent by referring to the exemplary embodiments to be described in detail with reference to the accompanying drawings. However, the invention is not limited to the exemplary embodiments disclosed hereinafter, but can be implemented in diverse provides. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments will hereinafter be described with reference to the accompanying drawings.

Figure 2:
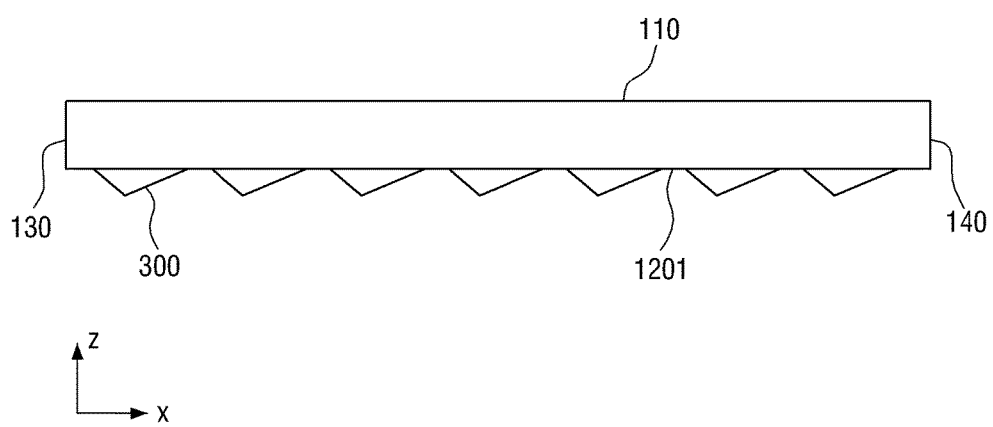
FIG. 2 is a cross-sectional view of the light guide panel illustrated in FIG. 1.
Figure 3:
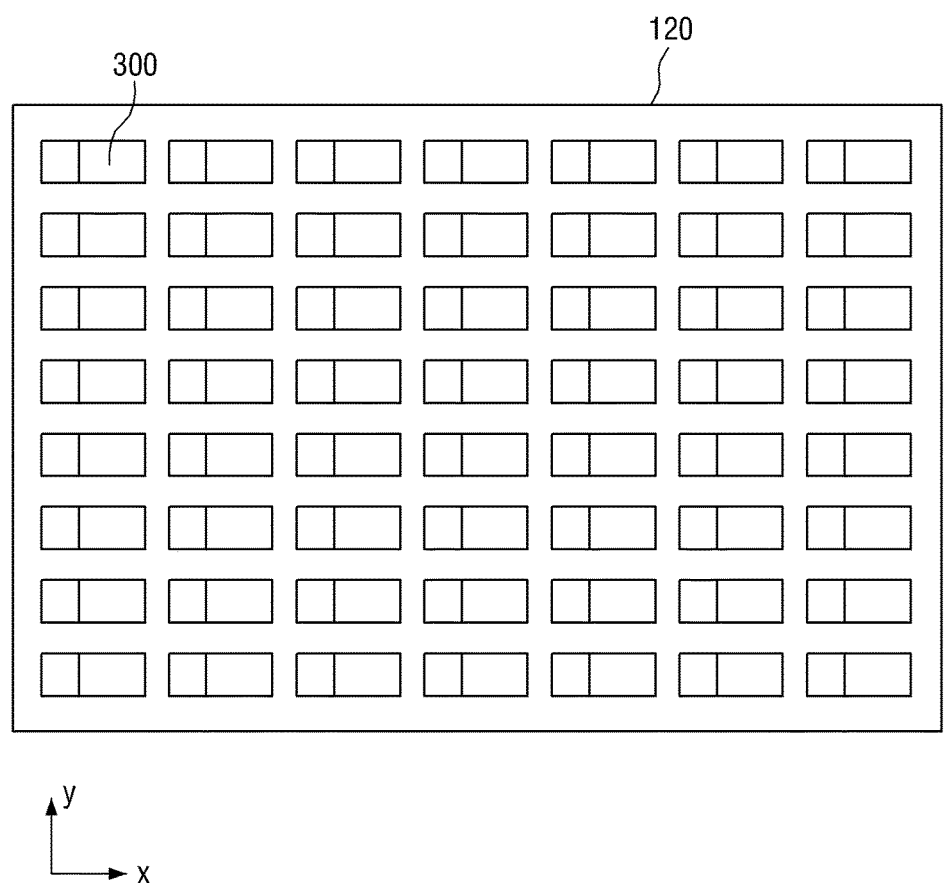
FIG. 3 is a bottom view of the light guide panel illustrated in FIG. 1.

FIG. 1 is a perspective view of a light guide panel according to an exemplary embodiment, FIG. 2 is a cross-sectional view of the light guide panel illustrated in FIG. 1, and FIG. 3 is a bottom view of the light guide panel illustrated in FIG. 1.

Referring to FIGS. 1 and 3, a light guide panel 100 includes a top surface 110, which has first and second sides that extend in X- and Y-axis directions, respectively, a bottom surface 120, which is disposed opposite to the top surface 110, and a first side surface 130 and a second side surface 140 which are disposed between the top surface 110 and the bottom surface 120 and face each other. The bottom surface 120 includes a base surface 1201 and a plurality of diffusion patterns 300 which is provided to protrude from, or to be recessed into, the base surface 1201. Each of the diffusion patterns 300 includes a first inclined surface 310 which defines a first inclination angle β with the base surface 1201 and a second inclined surface 320 which adjoins the first inclined surface 310 and defines a second inclination angle α with the base surface 1201 (refers to FIGS. 4 and 5).

The top surface 110 may extend in a horizontal direction. The top surface 110 is illustrated in FIG. 1 as being a flat surface, but is not limited to the shape as illustrated in FIG. 1. That is, one or more patterns with a particular shape may be disposed on the top surface 110, or the top surface 110 may be partially inclined, which will be described later in further detail.

In an exemplary embodiment, the top surface 110 may be rectangular. That is, the top surface 110 may have four sides including a first side 110a extending in the X-axis direction and a second side 110b extending in the Y-axis direction. The second side 110b may be a tangent line to the first side surface 130.

The bottom surface 120 may be disposed opposite to the top surface 110. The bottom surface 120 may have the same shape as the top surface 110. That is, the top surface 110 and the bottom surface 120 may be parallel to each other, extend in the horizontal direction, have substantially the same shape, and face each other. In a non-limiting exemplary embodiment, the top surface 110 and the bottom surface 120 may both be rectangular.

The first side surface 130 and the second side surface 140 may be disposed between the top surface 110 and the bottom surface 120. The upper edges of the first side surface 130 and the second side surface 140 may adjoin the top surface 110, and the lower edges of the first side surface 130 and the second side surface 140 may adjoin the bottom surface 120. That is, the top surface 110 and the bottom surface 120 may be the base sides of a cube or a cuboid, and the first side surface 130 and the second side surface 140 may be a pair of parallel sides of the cube or the cuboid.

At least one of the first side surface 130 and the second side surface 140 may be disposed within a vicinity of a light source unit 200, and this will be described later in further detail.

The first side surface 130 and the second side surface 140 are illustrated in FIG. 1 as having the same width, but may have different widths from each other in another exemplary embodiment. The first side surface 130 and the second side surface 140 are illustrated in FIG. 1 as being flat surfaces, but may include one or more patterns with a particular shape provided thereon. In an exemplary embodiment, the first side surface 130 or the second side surface 140 may partially include rugged portions.

The bottom surface 120 may include the base surface 1201 and one or more diffusion patterns 300 which protrude from or are recessed into the base surface 1201.

The base surface 1201 may be a flat surface and may be a basis for making a determination as to whether the diffusion patterns 300 are provided as protrusions or recesses.

One or more diffusion patterns 300 may be provided on the bottom surface 120. The diffusion patterns 300 may be arranged in a matrix, but the invention is not limited thereto. That is, in another exemplary embodiment, the diffusion patterns 300 may be unevenly distributed on the bottom surface 120. The diffusion patterns 300 may have substantially the same size, but the invention is not limited thereto. That is, in another exemplary embodiment, the diffusion patterns 300 may have different sizes.

The diffusion patterns 300 may be provided to protrude from, or to be recessed into, the base surface 1201. More specifically, the diffusion patterns 300 may protrude downward from the reference surface 1201 or may be recessed upwardly into the reference surface 1201 to face the top surface 110. The diffusion patterns 300 will be described later in further detail.

The light guide panel 100 including the top surface 110, the bottom surface 120, the first side surface 130 and the second side surface 140 may include a transparent material. The term "transparent", as used herein, may mean both complete transparency and semi-transparency.

The light guide panel 100 may be provided to be transparent by using, for example, polycarbonate ("PC") or, polymethyl methacrylate ("PMMA"), but the invention is not limited thereto.

In an exemplary embodiment, the light guide panel 100 may have flexibility. The flexibility of the light guide panel 100 may be determined by the thickness, shape and material of the light guide panel 100, but the invention is not limited thereto.

Figure 4:
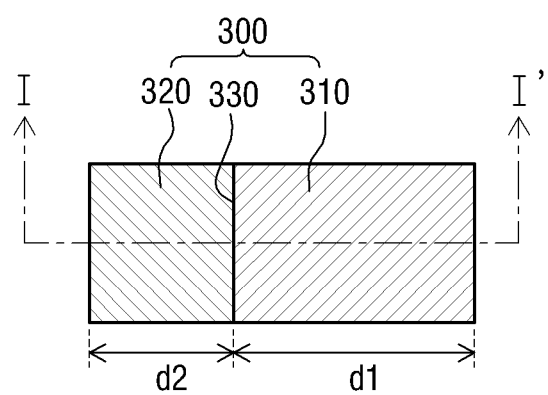
FIG. 4 is a partial enlarged view of a diffusion pattern illustrated in FIG. 1.
Figure 5:
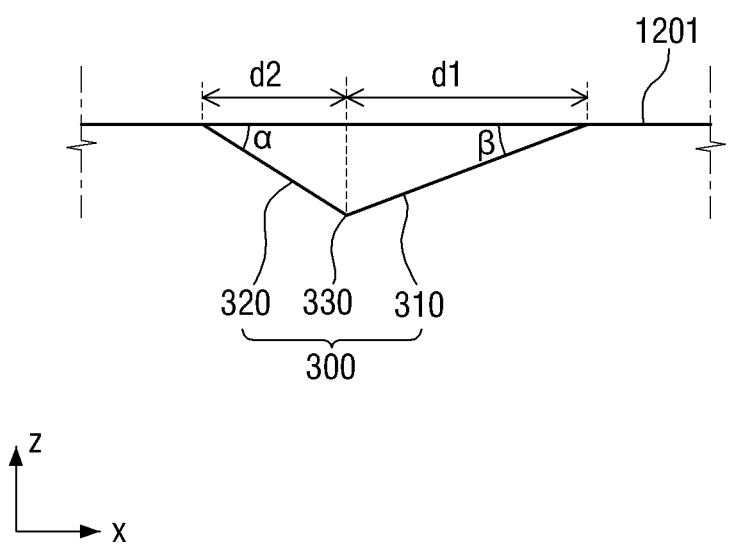
FIG. 5 is a cross-sectional view of the diffusion pattern illustrated in FIG. 4, taken along line I-I' of FIG. 4.

FIG. 4 is a partial enlarged view of a diffusion pattern illustrated in FIG. 1, and FIG. 5 is a cross-sectional view of the diffusion pattern illustrated in FIG. 4, taken along line I-I' of FIG. 4.

Referring to FIGS. 4 and 5, a diffusion pattern 300 may include a first inclined surface 310 and a second inclined surface 320. For convenience, assume that the diffusion pattern 300 is provided to protrude from the base surface 1201. An exemplary embodiment in which the diffusion pattern 300 is provided to be recessed into the base surface 1201 will be described later in detail.

The first inclined surface 310 and the second inclined surface 320 may be disposed side-by-side in the X-axis direction. That is, the second inclined surface 320 may be disposed near the first side surface 130, and the first inclined surface 310 may be disposed near the second side surface 140. More specifically, in response to the light source unit 200 being disposed near the first side surface 130, the second inclined surface 320 may be disposed near the first side surface 130, and the first inclined surface 310 may be disposed near the second side surface 140.

The first inclined surface 310 and the second inclined surface 320 may be inclined downwardly from the base surface 1201 in a cross section. More specifically, as illustrated in FIG. 5, the first inclined surface 310 and the second inclined surface 320 may be inclined downwardly from the base surface 1201, and may then adjoin each other. That is, a boundary portion 330 may be provided along the adjoining edges of the first inclined surface 310 and the second inclined surface 320. Accordingly, the diffusion pattern 300 may have a triangular cross-sectional shape, and the first inclined surface 310 and the second inclined surface 320 may provide two sides of the triangular cross-sectional shape.

The first inclined surface 310 may define a first inclination angle β with the base surface 1201, and the second inclined surface 320 may define a second inclination angle α with the base surface 1201. That is, the first inclination angle β and the second inclination angle α may be two internal angles of the triangular cross-sectional shape illustrated in FIG. 5.

In an exemplary embodiment, the first inclination angle β may be smaller than the second inclination angle α. In the exemplary embodiment, a horizontal distance d1 of the first inclined surface 310 may be greater than a horizontal distance d2 of the second inclined surface 320.

In an exemplary embodiment, the first inclination angle β may range from about 1.8 degrees (°) to about 5.7°. The advantages of the diffusion pattern 330 having a first inclination angle β within the range of about 1.8° to about 5.7° will hereinafter be described with reference to the experimental exemplary embodiment s as illustrated in FIGS. 6 to 8.

Figure 6:
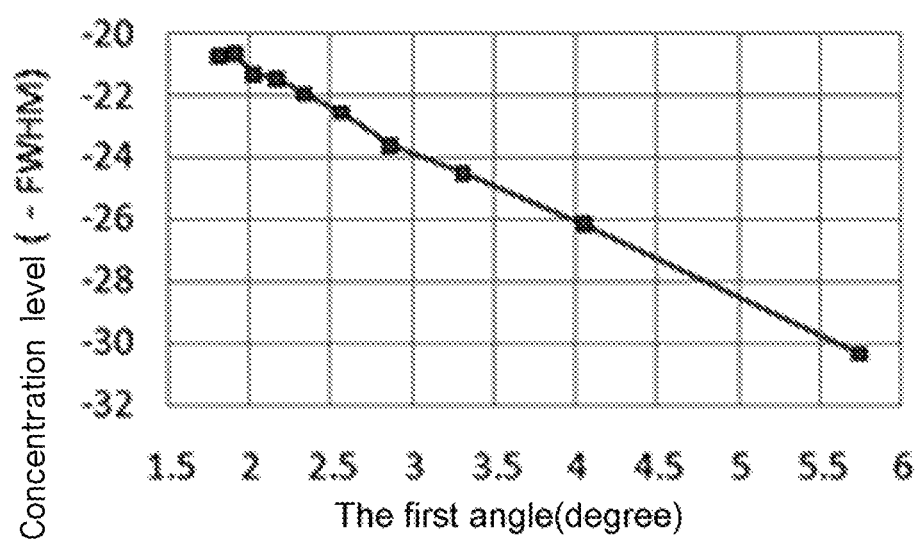
FIG. 6 is a graph showing the relationship between a first inclination angle (β) and a light concentration level measured in full width at half maximum (FWHM)
Figure 7:
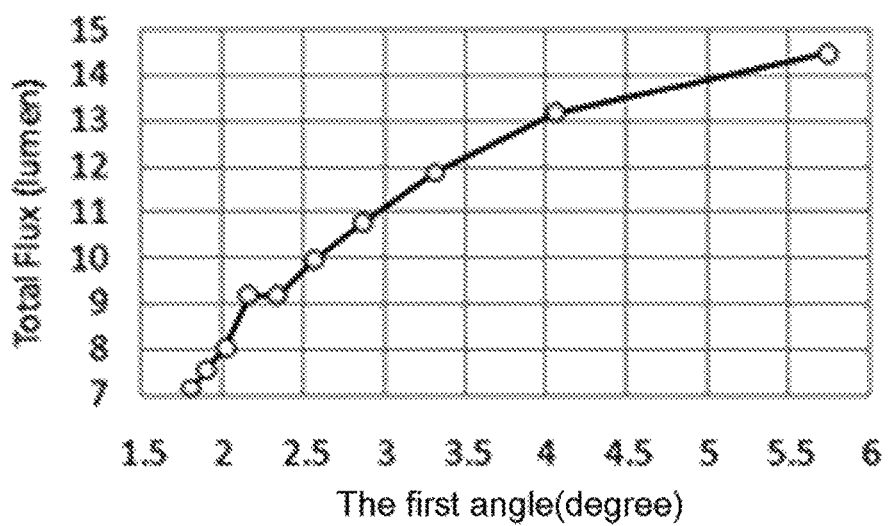
FIG. 7 is a graph showing the relationship between the first inclination angle (β) and total flux measured in lumen.
Figure 8:
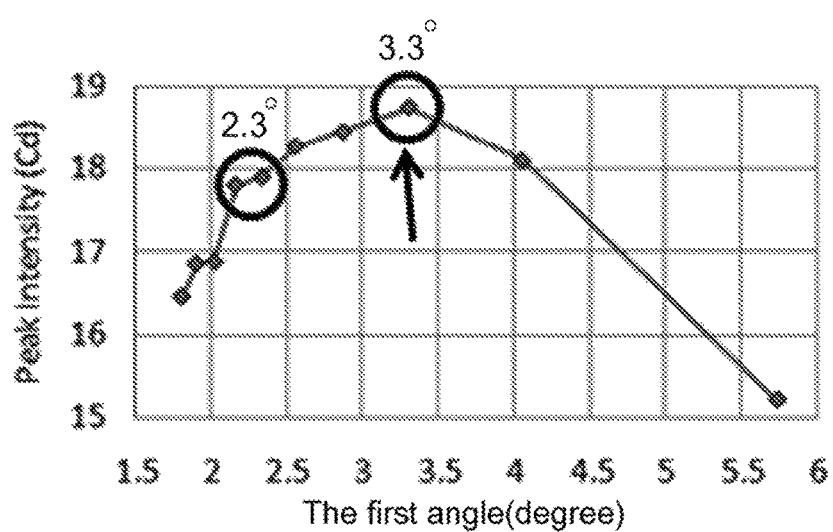
FIG. 8 is a graph showing the relationship between the first inclination angle (β) and the brightness of forward-emitted light measured in candela (Cd)

FIG. 6 is a graph showing the relationship between the first inclination angle β and a light concentration level, FIG. 7 is a graph showing the relationship between the first inclination angle β and total flux, and FIG. 8 is a graph showing the relationship between the first inclination angle β and the brightness of forward-emitted light.

Referring to FIGS. 6 to 8, light emitted forward from the light guide panel 100 through the top surface 110 may have more excellent brightness properties when the first inclination angle β is within the range of about 1.8° to about 5.7° than when the first inclination angle β is out of the range. In an exemplary embodiment, the first inclination angle β may be about 3.3°. In the exemplary embodiment, the brightness of light emitted forward from the light guide panel 100 through the top surface 110 reaches its maximum. That is, the smaller the first inclination angle β, the higher the light concentration level, as illustrated in FIG. 6, and the lower the total flux, as illustrated in FIG. 7. That is, a light concentration level and total flux have opposite effects on the brightness of light emitted forward from the light guide panel 100. Accordingly, it is important to appropriately determine the first inclination angle β and thus to strike a balance between a light concentration level and total flux. The experimental results of FIGS. 6 to 8 show that a desired forward-emitted light brightness can be obtained when the first inclination angle β is within the range of about 1.8° to about 5.7°, and particularly, is about 3.3°.

In an exemplary embodiment, the first inclined surface 310 and the second inclined surface 320 may be rectangular in a plan view. In an alternative exemplary embodiment, the first inclined surface 310 and the second inclined surface 320 may be circular, or at least partially curved in a plan view. The shape of the first inclined surface 310 and the second inclined surface 320 will be described later in further detail.

A path of light within the light guide panel 100 will hereinafter be described with reference to FIG. 9.

Figure 9:
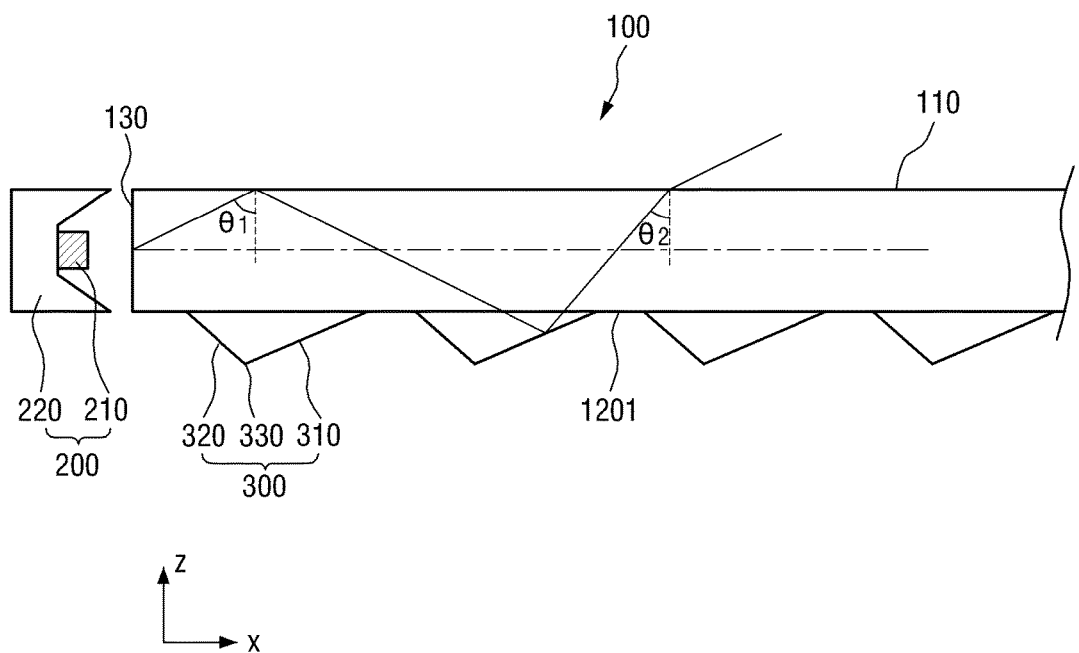
FIG. 9 is a cross-sectional view of the light guide panel illustrated in FIG. 1.

FIG. 9 is a cross-sectional view of the light guide panel illustrated in FIG. 1.

Referring to FIG. 9, light emitted from the light source unit 200, which is disposed near the first side surface 130, may be totally reflected within the light guide panel 100, and may then be emitted forward from the top of the light guide panel 100 through the top surface 110.

More specifically, a beam of light emitted from the light source unit 200 may be incident upon the top surface 110. In response to the incidence angle (i.e., a first incidence angle θ1) of the beam being greater than a threshold angle, the beam may be totally reflected from the top surface 110, and may then travel toward the bottom surface 120 including the diffusion pattern 300 and the base surface 1201. In response to the beam reaching the first inclined surface 310, the beam may be reflected from the first inclined surface 310 and may then travel back toward the top surface 110. The angle at which the beam reflected by the inclined surface 310 is incident upon the top surface 110, i.e., a second incidence angle θ2, may be smaller than the first incidence angle θ1. In an exemplary embodiment, the second incidence angle θ2 may be smaller than the threshold angle. The beam may transmit through the top surface 110, and may then be emitted forward from the light guide panel 100 through the top surface 110.

Light incident upon the light guide panel 100 is illustrated in FIG. 9 as being totally reflected once, reflected from the first inclined surface 310, and emitted from the light guide panel 100, but the invention is not limited thereto. That is, in another exemplary embodiment, light incident upon the light guide panel 100 may be emitted from the light guide panel 100 without undergoing any total reflection, or after undergoing more than one total reflection. In the latter exemplary embodiment, the light may reach the first inclined surface 310 at least once. In response to the incidence angle of light reflected from the first inclined surface 310 toward the top surface 110 being greater than the threshold angle, the light may be totally reflected from the top surface 110, and may undergo the aforementioned process again. Light that goes through multiple total reflections within the light guide panel 100 may be reflected from the second side surface 140 (refers to FIGS. 1 and 2), and may then travel toward the top surface 110 or the bottom surface 120.

Other exemplary embodiments will hereinafter be described. With respect to the description that follows, like reference numerals indicate like elements, and thus, detailed descriptions thereof will be omitted.

Figure 10:
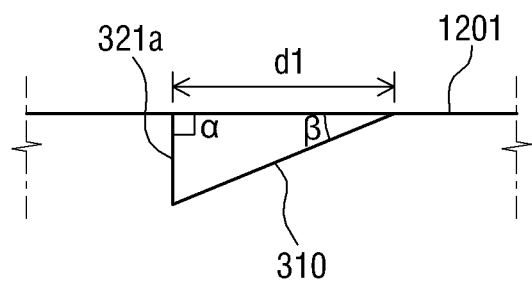
FIG. 10 is a cross-sectional view of a modified example exemplary embodiment of the diffusion pattern illustrated in FIG. 5.
Figure 10:
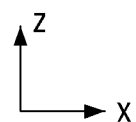

FIG. 10 is a cross-sectional view of a modified exemplary embodiment of the diffusion pattern illustrated in FIG. 5.

Referring to FIG. 10, a diffusion pattern, unlike the diffusion pattern of FIG. 5, has a substantially right angle as a second inclination angle α.

The second inclination angle α may be a substantially right angle, and a first inclination angle β of the diffusion pattern may be the same as that of the diffusion pattern of FIG. 5. In response to the second inclination angle α being a substantially right angle and the first inclination angle β being the same as its counterpart of FIG. 5, a horizontal distance d1 of a first inclined surface 310 may be relatively greater than the horizontal distance d1 of the first inclined surface 310 of the diffusion pattern of FIG. 5.

In response to the second inclination angle α being a substantially right angle, a horizontal distance of a second inclined surface 321a may be zero. That is, the second inclined surface 321a may be perpendicular to the base surface 1201.

Figure 11:
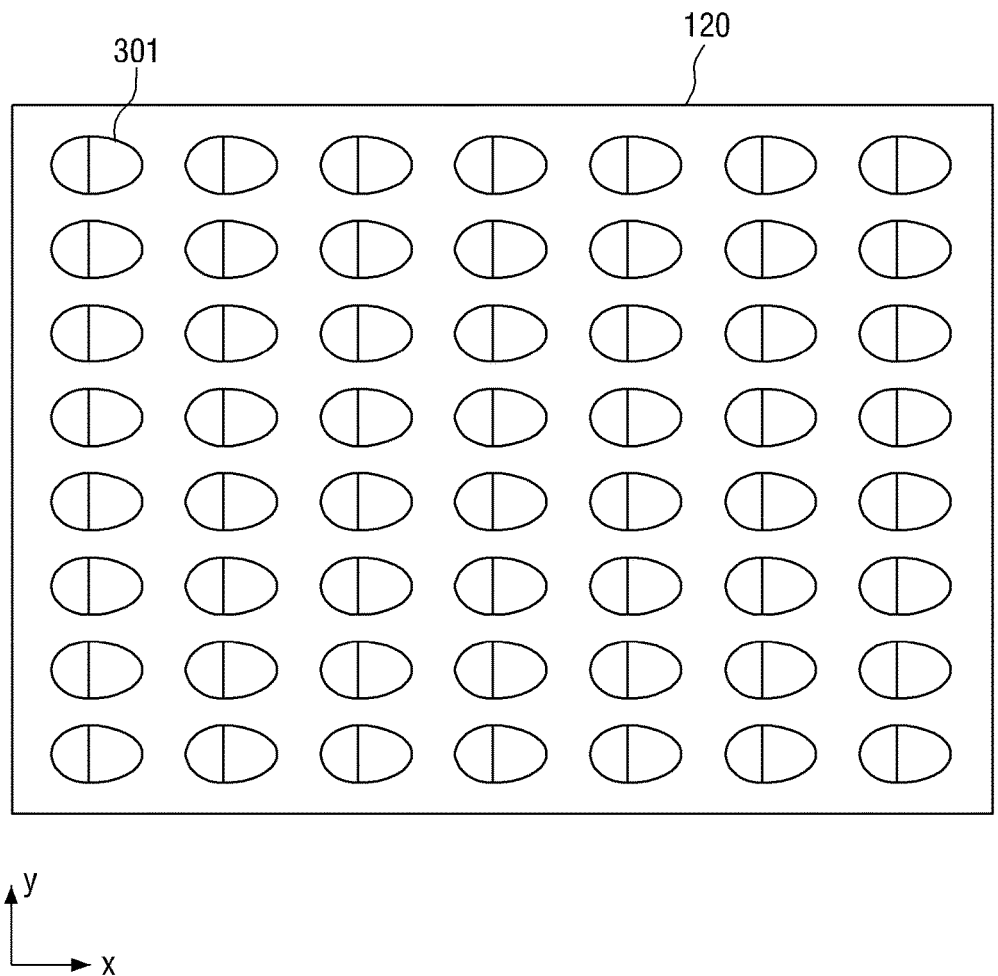
FIG. 11 is a bottom view of another exemplary embodiment of a light guide panel according to the invention.

FIG. 11 is a bottom view of a light guide panel according to another exemplary embodiment.

Referring to FIG. 11, the light guide differs from its counterpart of FIG. 3 in that a plurality of diffusion patterns 301 has a curved planar shape in a plan view.

Each of the diffusion patterns 301 may have a planar shape including a curved line. That is, each of the circumferences of the diffusion patterns 301 may be at least partially curved. In an exemplary embodiment, the diffusion patterns 301 may be provided in an elliptical shape having a long axis extending in the X-axis direction and a short axis extending in the Y-axis direction.

The shape of the diffusion patterns 301 will hereinafter be described in further detail with reference to FIGS. 12 and 13.

Figure 12:
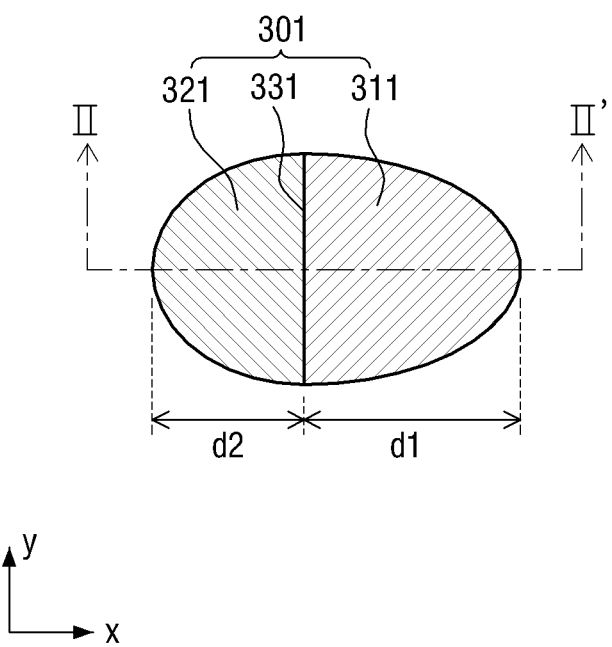
FIG. 12 is a partial enlarged view of a diffusion pattern illustrated in FIG. 11.
Figure 13:
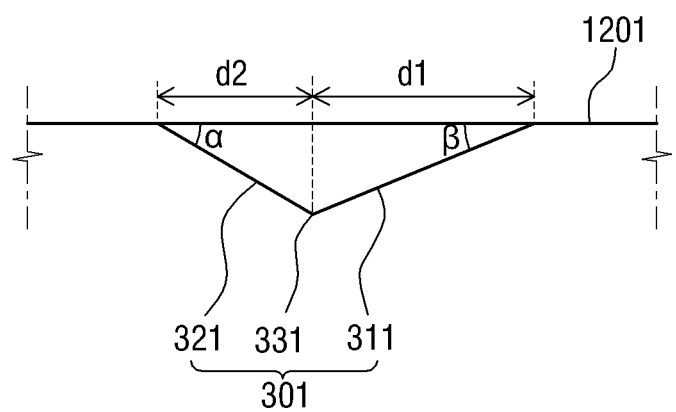
FIG. 13 is a cross-sectional view of the diffusion pattern illustrated in FIG. 12, taken along line II-II' of FIG. 12.

FIG. 12 is a partial enlarged view of a diffusion pattern illustrated in FIG. 11, and FIG. 13 is a cross-sectional view of the diffusion pattern illustrated in FIG. 12, taken along line II-II' of FIG. 12.

Referring to FIG. 12, a diffusion pattern 301 may include a first inclined surface 311 and a second inclined surface 321.

The second inclined surface 321 may be disposed near the first side surface 130 (refers to FIG. 1), and the first inclined surface 311 may be disposed near the second side surface 140 (refers to FIG. 1), as already discussed above with reference to FIG. 3.

Referring to FIG. 13, the diffusion pattern 301 may have substantially the same cross-sectional shape as its counterpart of FIG. 5.

More specifically, the diffusion pattern 301 may have a triangular cross-sectional shape, taken along a line parallel to the X-axis direction. That is, the circumference of the diffusion pattern 301 may be at least partially curved in a plan view, and the first inclined surface 311 and the second inclined surface 321 may be flat surfaces, rather than curved surfaces. Accordingly, a boundary portion 331 between the first inclined surface 311 and the second inclined surface 321, i.e., the adjoining edges of the first inclined surface 311 and the second inclined surface 321, may be parallel to the Y-axis direction.

Figure 14:
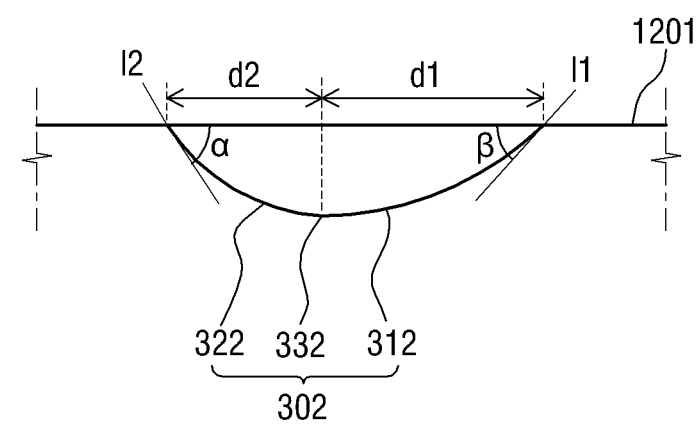
FIG. 14 is a cross-sectional view of a modified exemplary embodiment of the diffusion pattern illustrated in FIG. 13.

FIG. 14 is a cross-sectional view of a modified exemplary embodiment of the diffusion pattern illustrated in FIG. 13.

Referring to FIG. 14, a first inclined surface 312 and a second inclined surface 322 of a diffusion pattern 302 may include curved surfaces in a cross section. The cross section, along the X-axis direction, of the diffusion pattern 302 may have a downwardly-curved parabolic shape. That is, the circumference of the cross section of the diffusion pattern 302 may be partially parabolic. The first inclined surface 312 and the second inclined surface 322 may be inclined downwardly and gently curved from the base surface 1201. A boundary portion 332 between the first inclined surface 312 and the second inclined surface 322 may be straight, rather than curved.

In an exemplary embodiment, the angle between the base surface 1201 and a tangent line 11 that passes through a point of contact between the first inclined surface 312 and the base surface 1201 may be defined as a first inclination angle $\beta$, and the angle between the base surface 1201 and a tangent line 12 that passes through a point of contact between the second inclined surface 322 and the base surface 1201 may be defined as a second inclination angle $\alpha$. In the exemplary embodiment, the first inclination angle $\beta$ may be within the range of about 1.8° to about 5.7°, as already discussed above.

Figure 15:
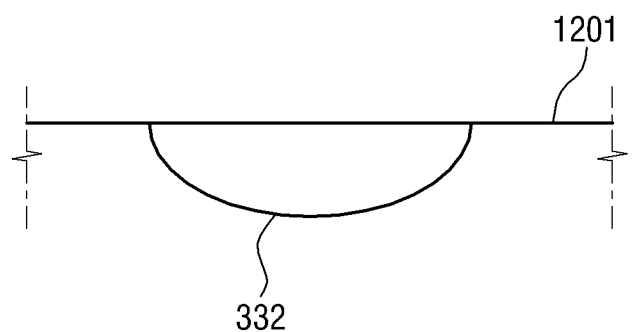
FIG. 15 is a cross-sectional view of the diffusion pattern illustrated in FIG. 13, taken along a Y-axis direction.

FIG. 15 is a cross-sectional view of a modified exemplary embodiment of the diffusion pattern illustrated in FIG. 13, taken along the Y-axis direction.

Referring to FIG. 15, the cross section, along the Y-axis direction (for example, along the boundary portion 332), of the diffusion pattern 302 may have a downwardly-curved parabolic shape.

In an exemplary embodiment, a plurality of diffusion patterns 302 having the cross-sectional shapes illustrated in FIGS. 14 and 15 may be provided. That is, the cross sections, along the X- and Y-axis directions, of each of the diffusion patterns 302 may both have a downwardly-curved parabolic shape, i.e., a semielliptical shape. In other words, each of the diffusion patterns 302 may be provided in the shape of a rugby ball, for example, cut in half along a plane including the longer axis thereof.

Figure 16:
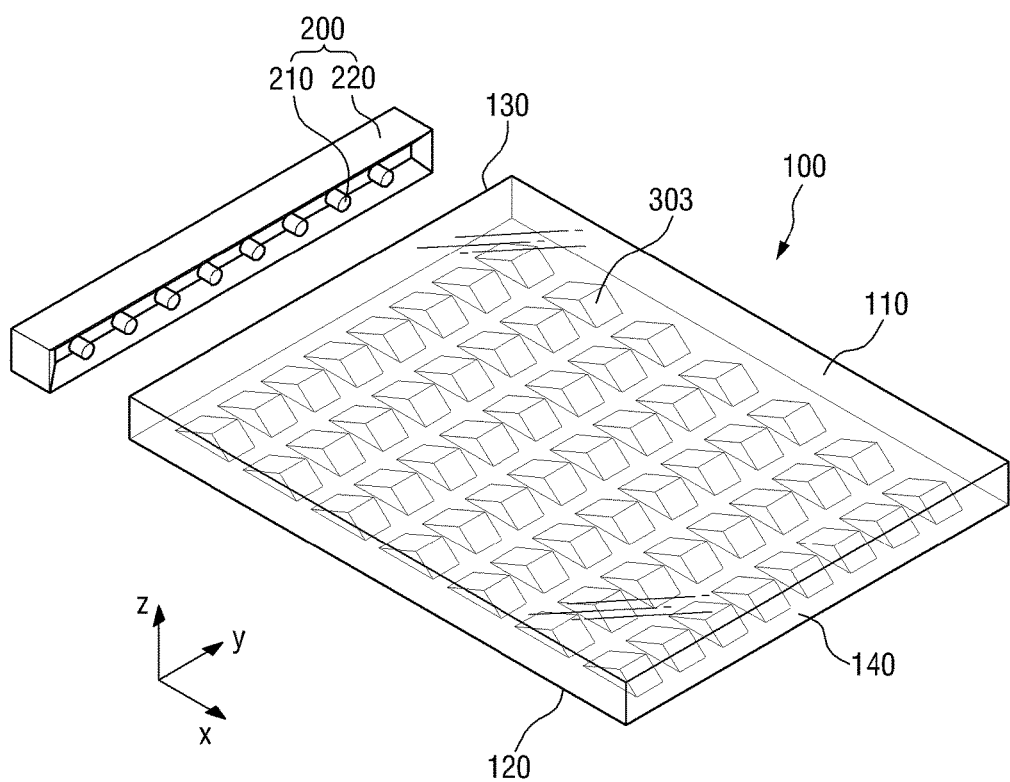
FIG. 16 is a perspective view of another exemplary embodiment of a light guide panel according to the invention.
Figure 17:
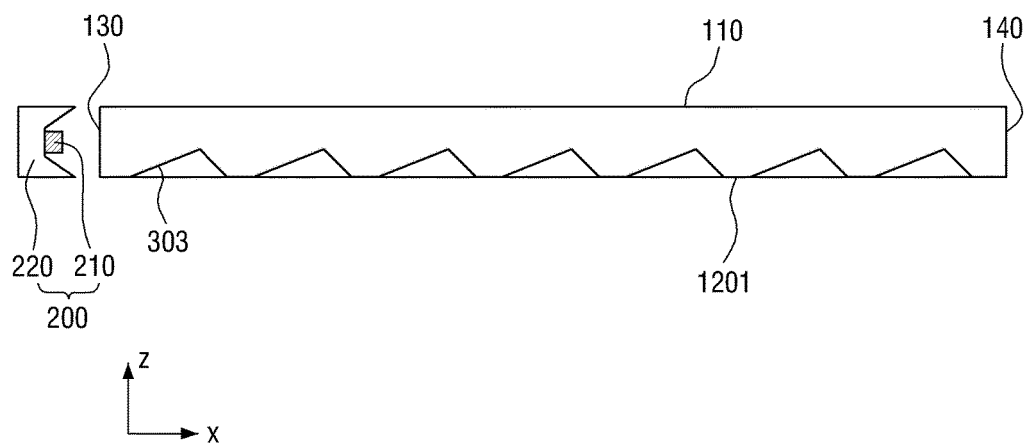
FIG. 17 is a cross-sectional view of the light guide panel illustrated in FIG. 16.
Figure 18:
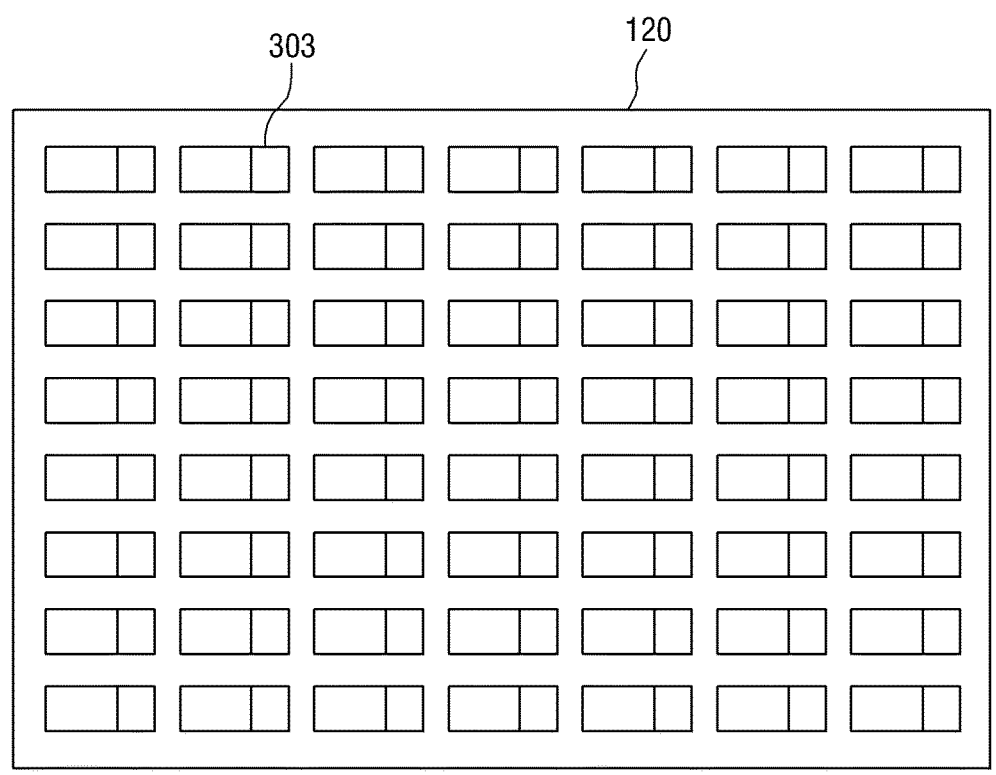
FIG. 18 is a bottom view of the light guide panel illustrated in FIG. 16.

FIG. 16 is a perspective view of a light guide panel according to another exemplary embodiment, FIG. 17 is a cross-sectional view of the light guide panel illustrated in FIG. 16, and FIG. 18 is a bottom view of the light guide panel illustrated in FIG. 16.

Referring to FIGS. 16 to 18, a light guide panel 100 differs from its counterparts of FIGS. 1 to 3 in that a plurality of diffusion patterns 303 is recessed into a base surface 1201.

More specifically, the diffusion patterns 303 may be provided to be recessed into the base surface 1201 of a bottom surface 120 toward a top surface 110.

As already discussed above, the base surface 1201 may be a basis for making a determination as to whether the diffusion patterns 300 are provided as protrusions or recesses.

One or more diffusion patterns 303 may be provided on the bottom surface 120. The diffusion patterns 303 may be arranged in a matrix, but the invention is not limited thereto. That is, in another exemplary embodiment, the diffusion patterns 303 may be unevenly distributed on the bottom surface 120. The diffusion patterns 303 may have substantially the same size, but the invention is not limited thereto. That is, in another exemplary embodiment, the diffusion patterns 303 may have different sizes.

The shape of the diffusion patterns 303 will hereinafter be described in further detail with reference to FIGS. 19 and 20.

Figure 19:
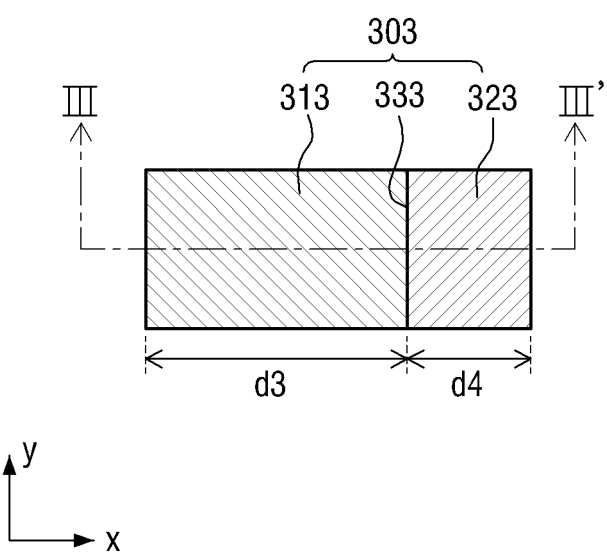
FIG. 19 is a partial enlarged view of a diffusion pattern illustrated in FIG. 18.
Figure 20:
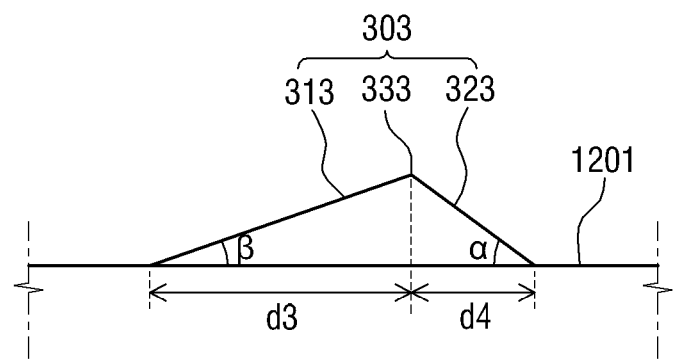
FIG. 20 is a cross-sectional view of the diffusion pattern illustrated in FIG. 19, taken along line of FIG. 19.

FIG. 19 is a partial enlarged view of a diffusion pattern illustrated in FIG. 18, and FIG. 20 is a cross-sectional view of the diffusion pattern illustrated in FIG. 19, taken along line of FIG. 19.

Referring to FIGS. 19 and 20, a diffusion pattern 303 may include a first inclined surface 313 and a second inclined surface 323.

The first inclined surface 313 and the second inclined surface 323 may be disposed side-by-side along the X-axis direction. In the exemplary embodiment illustrated in FIGS. 19 and 20, unlike in the exemplary embodiment illustrated in FIGS. 4 and 5, the first inclined surface 313 may be disposed near the first side surface 130 (refers to FIG. 16), and the second inclined surface 323 may be disposed near the second side surface 140 (refers to FIG. 16). More specifically, in response to the light source unit 200 being disposed near the first side surface 130, the first inclined surface 313 may be disposed nearer than the second inclined surface 323 to the light source unit 200.

The first inclined surface 313 and the second inclined surface 323 may be inclined upwardly from the base surface 1201. More specifically, as illustrated in FIG. 20, the first inclined surface 313 and the second inclined surface 323 may be inclined upwardly from the base surface 1201, and may then adjoin each other. That is, a boundary portion 333 may be provided along the adjoining edges of the first inclined surface 313 and the second inclined surface 323.

Accordingly, the diffusion pattern 303 may have a triangular cross-sectional shape in a cross section, and the first inclined surface 313 and the second inclined surface 323 may provide two sides of the triangular cross-sectional shape.

The first inclined surface 313 may define a first inclination angle $\beta$ with the base surface 1201, and the second inclined surface 323 may define a second inclination angle $\alpha$ with the base surface 1201. That is, the first inclination angle $\beta$ and the second inclination angle $\alpha$ may be two internal angles of the triangular cross-sectional shape illustrated in FIG. 20.

In an exemplary embodiment, the first inclination angle $\beta$ may be smaller than the second inclination angle $\alpha$. In the exemplary embodiment, a horizontal distance d3 of the first inclined surface 313 may be greater than a horizontal distance d4 of the second inclined surface 323.

In an exemplary embodiment, the first inclination angle $\beta$ may range from about 1.8° to about 5.7°. In the exemplary embodiment, the light guide panel 100 can provide excellent forward-emitted light brightness properties, as already discussed above with reference to FIGS. 6 to 8. In an exemplary embodiment, the second inclination angle $\alpha$ may be, but is not limited to, an acute angle. In an alternative exemplary embodiment, the second inclination angle $\alpha$ may be a right angle.

In an exemplary embodiment, the first inclined surface 313 and the second inclined surface 323 may be rectangular in a plan view. In an alternative exemplary embodiment, the first inclined surface 313 and the second inclined surface 323 may be circular, or at least partially curved in a plan view. The shape of the first inclined surface 313 and the second inclined surface 323 will be described later in further detail.

A path of light within the light guide panel 100 will hereinafter be described with reference to FIG. 21.

Figure 21:
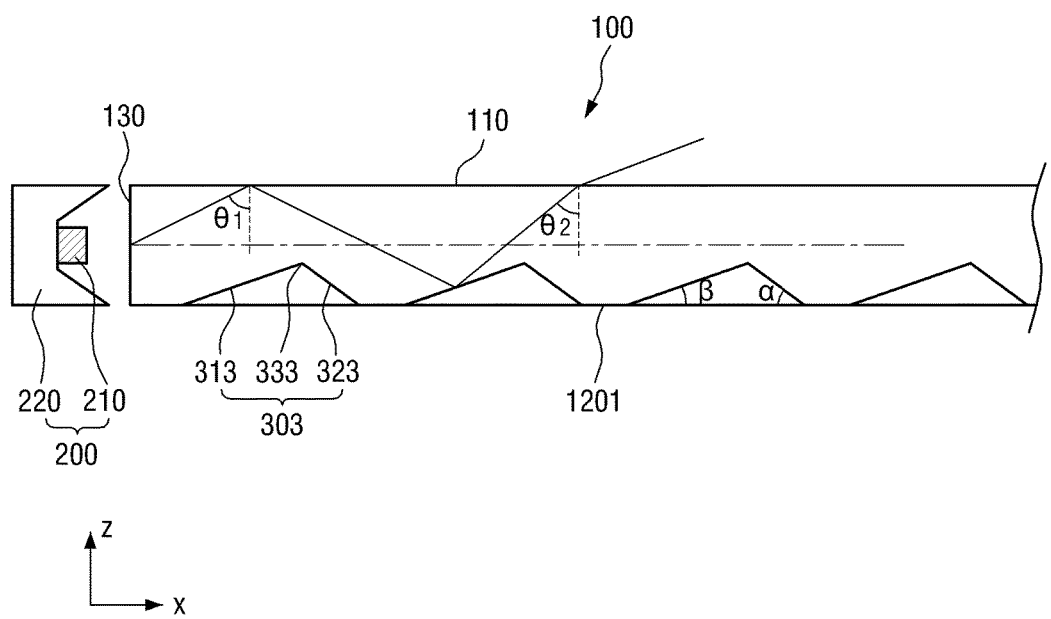
FIG. 21 is a cross-sectional view of the light guide panel illustrated in FIG. 16.

FIG. 21 is a cross-sectional view of the light guide panel illustrated in FIG. 16.

Referring to FIG. 21, light emitted from the light sources 210, which are disposed near the first side surface 130, may be totally reflected within the light guide panel 100, and may then be emitted forward from the top of the light guide panel 100 through the top surface 110.

More specifically, a beam of light emitted from the light sources 210 may be incident upon the top surface 110. In response to the incidence angle (i.e., a first incidence angle θ1) of the beam being greater than a threshold angle, the beam may be totally reflected from the top surface 110, and may then travel toward the bottom surface 120. In response to the beam reaching the first inclined surface 313, the beam may be reflected from the first inclined surface 313 and may then travel back toward the top surface 110. The angle at which the beam reflected by the inclined surface 313 is incident upon the top surface 110, i.e., a second incidence angle θ2, may be smaller than the first incidence angle θ1. In an exemplary embodiment, the second incidence angle θ2 may be smaller than the threshold angle. The beam may transmit through the top surface 110, and may then be emitted forward from the light guide panel 100 through the top surface 110.

Light incident upon the light guide panel 100 is illustrated in FIG. 21 as being totally reflected once, reflected from the first inclined surface 313, and emitted from the light guide panel 100, but the invention is not limited thereto. That is, in another exemplary embodiment, light incident upon the light guide panel 100 may be emitted from the light guide panel 100 without undergoing any total reflection, or after undergoing more than one total reflection. In the latter exemplary embodiment, the light may reach the first inclined surface 313 at least once. In response to the incidence angle of light reflected from the first inclined surface 313 toward the top surface 110 being greater than the threshold angle, the light may be totally reflected from the top surface 110, and may undergo the aforementioned process again. Light that goes through multiple total reflections within the light guide panel 100 may be reflected from the second side surface 140, and may then travel toward the top surface 110 or the bottom surface 120.

That is, the path of light within the light guide panel 100 may be substantially the same as that illustrated in FIG. 6.

Figure 22:
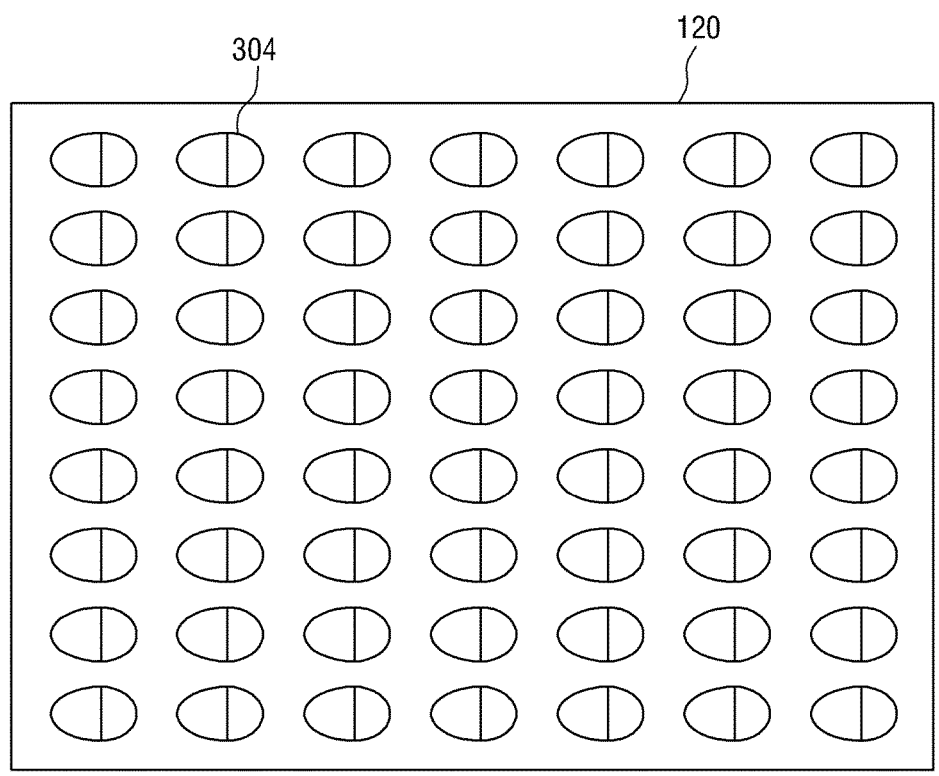
FIG. 22 is a bottom view of another exemplary embodiment of a light guide panel according to the invention.
Figure 22:
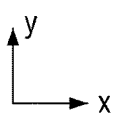

FIG. 22 is a bottom view of a light guide panel according to another exemplary embodiment.

Referring to FIG. 22, the light guide differs from its counterpart of FIG. 18 in that a plurality of diffusion patterns 304 has a curved planar shape.

Each of the diffusion patterns 304 may have a planar shape including a curved line in a plan view. That is, each of the circumferences of the diffusion patterns 304 may be at least partially curved. In an exemplary embodiment, the diffusion patterns 304 may be provided in an elliptical shape having a long axis extending in the X-axis direction and a short axis extending in the Y-axis direction.

The shape of the diffusion patterns 304 will hereinafter be described in further detail with reference to FIGS. 23 and 24.

Figure 23:
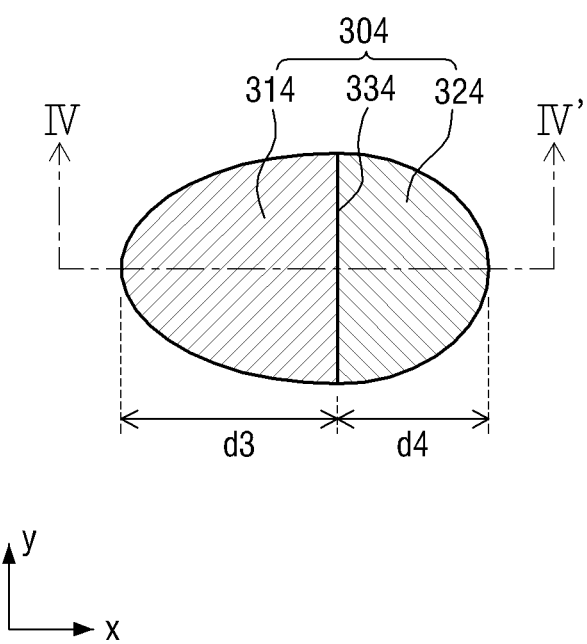
FIG. 23 is a partial enlarged view of a diffusion pattern illustrated in FIG. 22.
Figure 24:
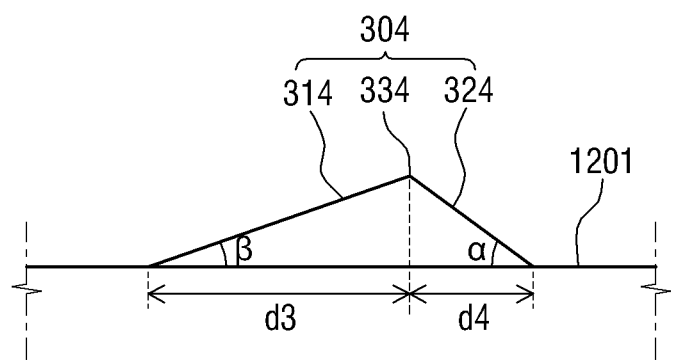
FIG. 24 is a cross-sectional view of the diffusion pattern illustrated in FIG. 23, taken along line IV-IV' of FIG. 23.

FIG. 23 is a partial enlarged view of a diffusion pattern illustrated in FIG. 22, and FIG. 24 is a cross-sectional view of the diffusion pattern illustrated in FIG. 23, taken along line IV-IV' of FIG. 23.

Referring to FIG. 23, a diffusion pattern 304 may include a first inclined surface 314 and a second inclined surface 324.

The first inclined surface 314 may be disposed near the first side surface 130, and the second inclined surface 324 may be disposed near the second side surface 140, as already discussed above with reference to FIG. 20.

Referring to FIG. 24, the diffusion pattern 304 may have substantially the same cross-sectional shape as its counterpart of FIG. 20.

More specifically, the diffusion pattern 304 may have a triangular cross-sectional shape, taken along a line parallel to the X-axis direction. That is, the circumference of the diffusion pattern 304 may be at least partially curved, and the first inclined surface 314 and the second inclined surface 324 may be flat surfaces, rather than curved surfaces. Accordingly, a boundary portion 334 between the first inclined surface 314 and the second inclined surface 324, i.e., the adjoining edges of the first inclined surface 314 and the second inclined surface 324, may be parallel to the Y-axis direction.

Figure 25:
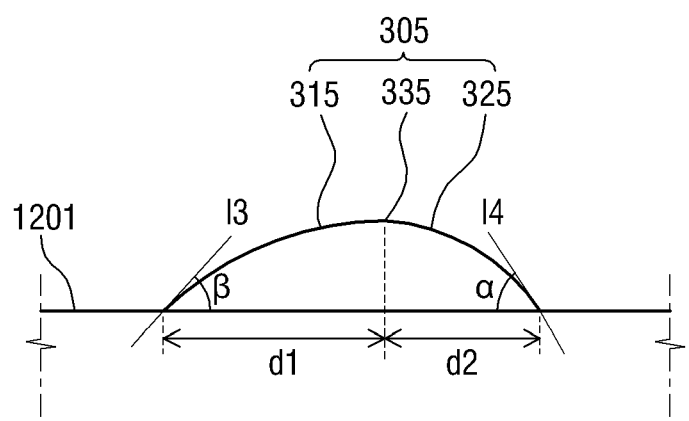
FIG. 25 is a cross-sectional view of a modified exemplary embodiment of the diffusion pattern illustrated in FIG. 24.

FIG. 25 is a cross-sectional view of a modified exemplary embodiment of the diffusion pattern illustrated in FIG. 24.

Referring to FIG. 25, a first inclined surface 315 and a second inclined surface 325 of a diffusion pattern 305 may include curved surfaces in a cross section.

That is, the cross section, along the X-axis direction, of the diffusion pattern 305 may have an upwardly-curved parabolic shape. That is, the circumference of the cross section of the diffusion pattern 305 may be partially parabolic. The first inclined surface 315 and the second inclined surface 325 may be inclined upwardly and gently curved from the base surface 1201. A boundary portion 335 between the first inclined surface 315 and the second inclined surface 325 may be straight, rather than curved.

In an exemplary embodiment, the angle between the base surface 1201 and a tangent line 13 that passes through a point of contact between the first inclined surface 315 and the base surface 1201 may be defined as a first inclination angle β, and the angle between the base surface 1201 and a tangent line 14 that passes through a point of contact between the second inclined surface 325 and the base surface 1201 may be defined as a second inclination angle α. In the exemplary embodiment, the first inclination angle β may be within the range of about 1.8° to about 5.7°, as already discussed above.

Figure 26:
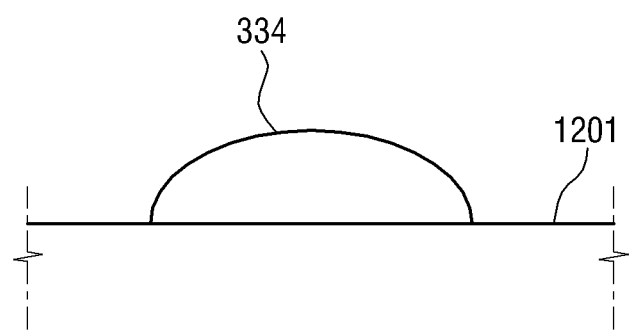
FIG. 26 is a cross-sectional view of the diffusion pattern illustrated in FIG. 25, taken along the Y-axis direction.

FIG. 26 is a cross-sectional view of a modified exemplary embodiment of the diffusion pattern illustrated in FIG. 24, taken along the Y-axis direction.

Referring to FIG. 26, the cross section, along the Y-axis direction (for example, along the boundary portion 334), of the diffusion pattern 305 may have an upwardly-curved parabolic shape.

In an exemplary embodiment, a plurality of diffusion patterns 305 having the cross-sectional shapes illustrated in FIGS. 25 and 26 may be provided. That is, the cross sections, along the X- and Y-axis directions, of each of the diffusion patterns 305 may both have an upwardly-curved parabolic shape, i.e., a semielliptical shape. In other words, each of the diffusion patterns 305 may be provided in the shape of a rugby ball, for example, cut in half along a plane including the longer axis thereof.

Figure 27:
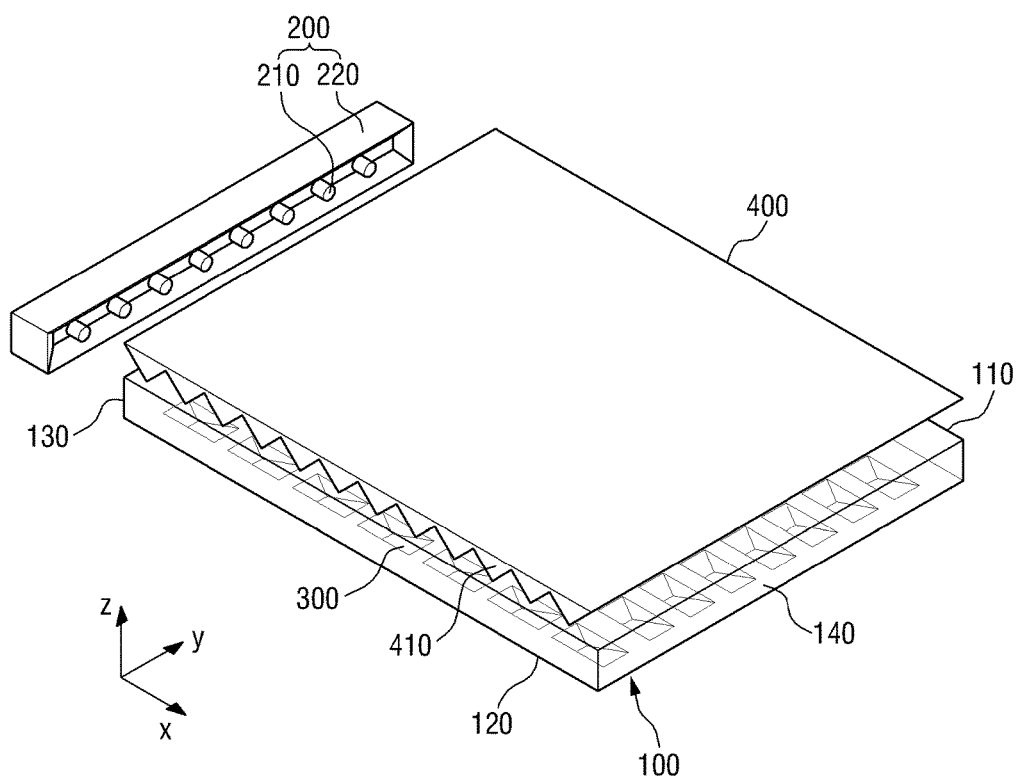
FIG. 27 is a perspective view of an exemplary embodiment of a backlight unit ("BLU") according to the invention.
Figure 28:
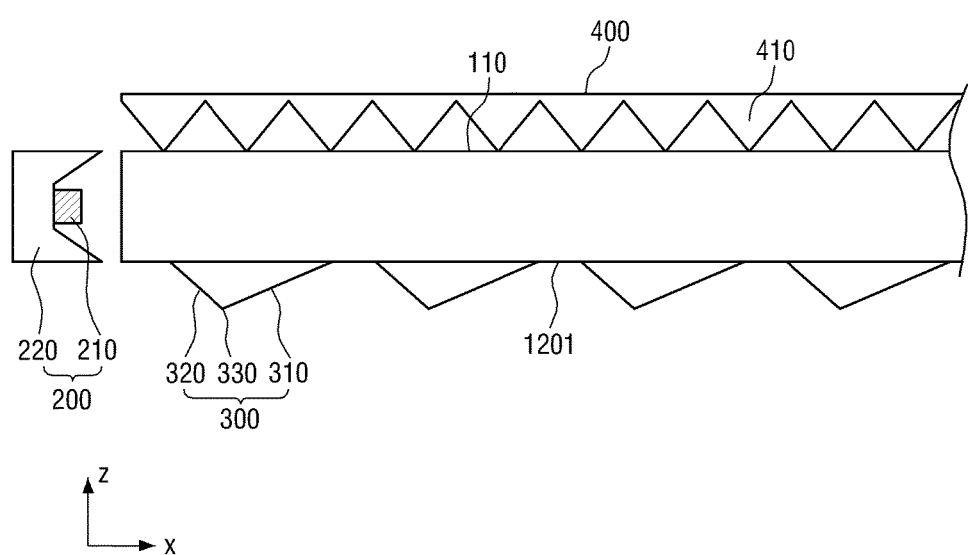
FIG. 28 is a cross-sectional view of the BLU illustrated in FIG. 27.

FIG. 27 is a perspective view of a backlight unit ("BLU") according to an exemplary embodiment, and FIG. 28 is a cross-sectional view of the BLU illustrated in FIG. 27.

Referring to FIGS. 27 and 28, a BLU includes a light guide panel 100, and the light guide panel 100 includes a top surface 110, which has first and second sides that extend in X- and Y-axis directions, respectively, a bottom surface 120, which is disposed opposite to the top surface 110, and a first side surface 130 and a second side surface 140 which are disposed between the top surface 110 and the bottom surface 120 and face each other, where the bottom surface 120 includes a base surface 1201 and a plurality of diffusion patterns 300 which is provided to protrude from, or to be recessed into, the base surface 1201, and each of the diffusion patterns 300 includes a first inclined surface 310 which defines a first inclination angle β with the base surface 1201 and a second inclined surface 320 which adjoins the first inclined surface 310 and defines a second inclination angle α with the base surface 1201. The BLU also includes a light source unit 200 which is disposed near the first side surface 130 of the light guide panel 100, and a prism sheet 400 which is disposed opposite to the top surface 110 of the light guide panel 100 and includes a plurality of prisms 410.

The light guide panel 100 may be substantially identical to its counterparts from the previous exemplary embodiments, and thus, a detailed description thereof will be omitted.

The light source unit 200 may be disposed near the first side surface 130 of the light guide panel 100. The light source unit 200 may include a base 220 which extends in the Y-axis direction and one or more light sources 210 which are disposed on one side of the base 220.

The base 220 may support the light sources 210, and may be provided as a bar extending along the Y-axis direction. In an exemplary embodiment, the base 220 may include sidewalls that at least partially surround the light sources 210.

One or more light sources 210 may be provided on one side of the base 220, i.e., a surface of the base 220 facing the first side surface 130 of the light guide panel 100. In an exemplary embodiment, the light sources 210 may be, but are not limited to, light-emitting diodes ("LEDs").

The light sources 210 may be arranged at regular intervals along the Y-axis direction.

The prism sheet 400 may be disposed on the light guide panel 100. More specifically, the prism sheet 400 may be placed in contact with the top surface 110 of the light guide panel 100 or may be apart from the top surface 110 of the light guide panel 100 with a predetermined distance.

The prism sheet 400 may include a plurality of prisms 410. The prisms 410 may be aligned side-by-side along the X-axis direction, and may extend along the Y-axis direction. That is, the prisms 410, which are bar-shaped in a plan view, may be aligned in parallel to the Y-axis direction.

Each of the prisms 410 may include a mountain-shaped portion in a cross section. The mountain-shaped portions of the prisms 410 may face the top surface 110 of the light guide panel 100. That is, as illustrated in FIG. 28, the cross sections, along the X-axis direction, of the prisms 410 have a triangular shape, and the term "mountain-shaped portion", as used herein, may indicate a peak portion of the triangular shape facing the top surface 110 of the light guide panel 100.

A path of light emitted from the light source unit 200 will hereinafter be described with reference to FIG. 29.

Figure 29:
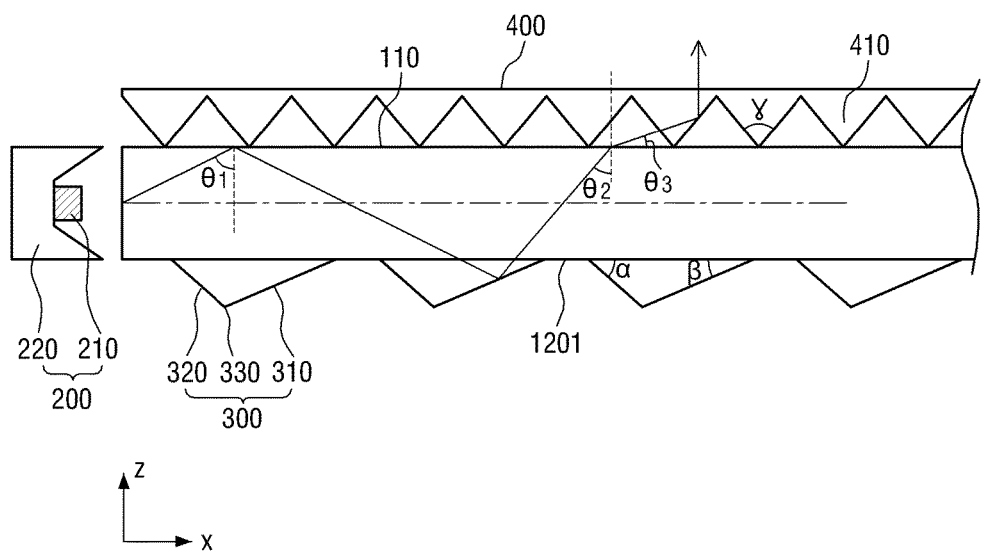
FIG. 29 is a cross-sectional view of the BLU illustrated in FIG. 27.

FIG. 29 is a cross-sectional view of the BLU illustrated in FIG. 27.

Referring to FIG. 29, light emitted from the light source unit 200, which is disposed near the first side surface 130, may be totally reflected within the light guide panel 100, and may then be emitted forward from the top of the light guide panel 100 through the top surface 110.

More specifically, a beam of light emitted from the light source unit 200 may be incident upon the top surface 110. In response to the incidence angle (i.e., a first incidence angle $\theta_1$) of the beam being greater than a threshold angle, the beam may be totally reflected from the top surface 110, and may then travel toward the bottom surface 120. In response to the beam reaching the first inclined surface 310, the beam may be reflected from the first inclined surface 310 and may then travel back toward the top surface 110. The angle at which the beam reflected by the inclined surface 310 is incident upon the top surface 110, i.e., a second incidence angle $\theta_2$, may be smaller than the first incidence angle $\theta_1$. In an exemplary embodiment, the second incidence angle $\theta_2$ may be smaller than the threshold angle. The beam may transmit through the top surface 110, and may then be emitted forward from the light guide panel 100 through the top surface 100.

In response to the second incidence angle $\theta_2$ being smaller than the threshold angle, the beam transmitted through the top surface 110 of the light guide panel 100 may travel toward the prism sheet 400 with a third refraction angle $\theta_3$. Then, the beam may transmit through one side of one of the prisms 410 and may be reflected from another side of the corresponding prism 410 so as to travel toward the top of the prism sheet 400.

Figure 30:
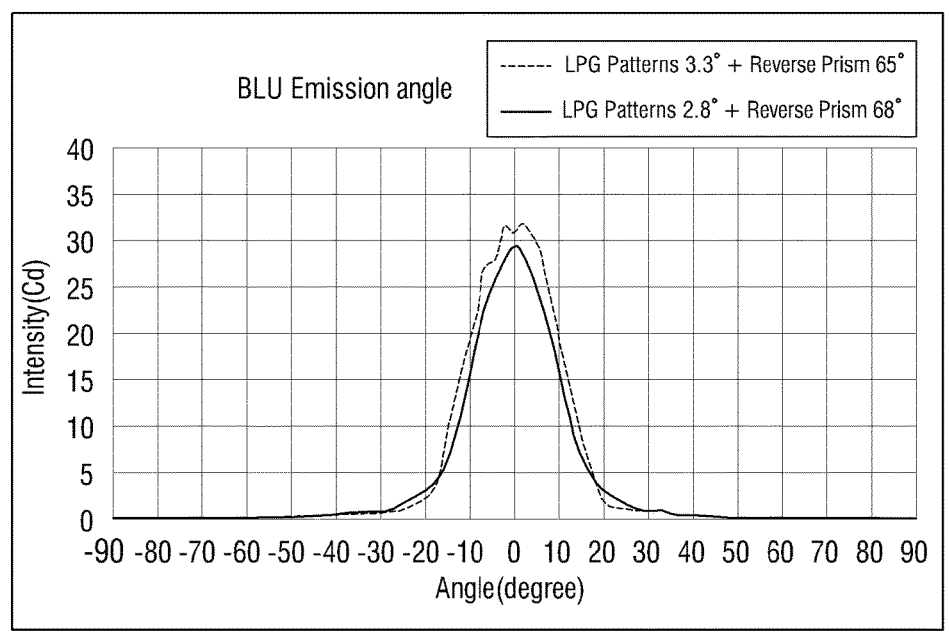
FIG. 30 is a graph showing the relationship between a first inclination angle, a third angle and the brightness of forward-emitted light from the BLU measured in candela (Cd)

The first inclination angle β of a beam incident upon the top surface 110 of the light guide panel 100 may satisfy Equation (1):

$$\beta = 1/2(\theta_i - \sin^{-1}[n_3/n_2 \sin(3\gamma/2 - 90)]) \quad (1)$$

where $\theta_1$ indicates the incidence angle of the beam, $n_2$ indicates the refractive index of the light guide panel 100, $n_3$ indicates the refractive index of the prism sheet 400, and γ indicates a third angle. By using the above equation, an optimum first inclination angle β for a predetermined incidence angle may be determined. Referring to FIG. 30, which shows experimental results obtained by using the above equation, the brightness of light emitted forward from a BLU reaches its maximum in response to the first inclination angle β and the third angle γ being about 3.3° and about 65°, respectively, and reaches its second maximum in response to the first inclination angle β and the third angle γ being about 2.3° and about 68°, respectively. That is, in response to the first inclination angle β being about 3.3° or about 2.3°, a BLU can have excellent forward-emitted light brightness properties.

Figure 31:
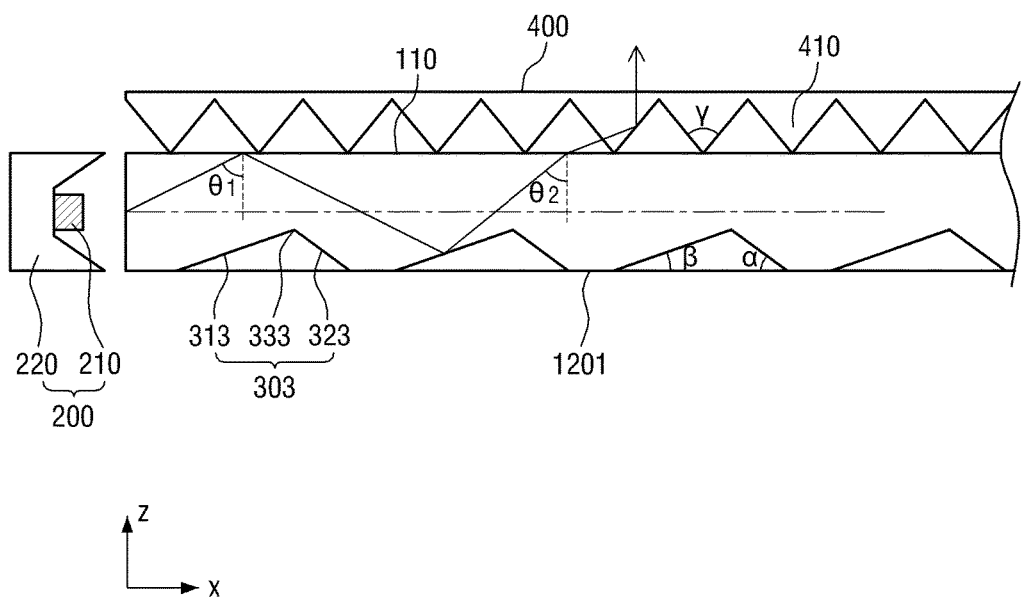
FIG. 31 is a cross-sectional view of a modified exemplary embodiment of the light guide panel illustrated in FIG. 29.

FIG. 31 is a cross-sectional view of a modified exemplary embodiment of the light guide panel illustrated in FIG. 29.

Referring to FIG. 31, the light guide panel 100 differs from its counterpart of FIG. 29 in that a plurality of diffusion patterns 303 is recessed into the base surface 1201 to face the top surface 110.

More specifically, the diffusion patterns 303 may be provided to be recessed into the base surface 1201 of the bottom surface 120 to face the top surface 110. In response to the diffusion patterns 303 being provided as recesses, the path of light within the light guide panel 100 may be substantially identical to that illustrated in FIG. 29. That is, a beam of light incident upon the top surface 110 of the light guide panel 100 may be totally reflected from the top surface 110, and may then travel toward the bottom surface 120. In response to the beam reaching the first inclined surface 313, the beam may be reflected from the first inclined surface 313 and may then travel back toward the top surface 110. In response to the beam reflected from the first inclined surface 313 being incident again upon the top surface 110 at a greater incidence angle than a threshold angle, the beam may transmit through the top surface 110 and may then travel toward the prism sheet 400, which is disposed above the light guide panel 100. Then, the beam may transmit through one side of one of the prisms 410 of the prism sheet 400 and may be reflected from another side of the corresponding prism 410 so as to be emitted forward from the prism sheet 400.

Figure 32:
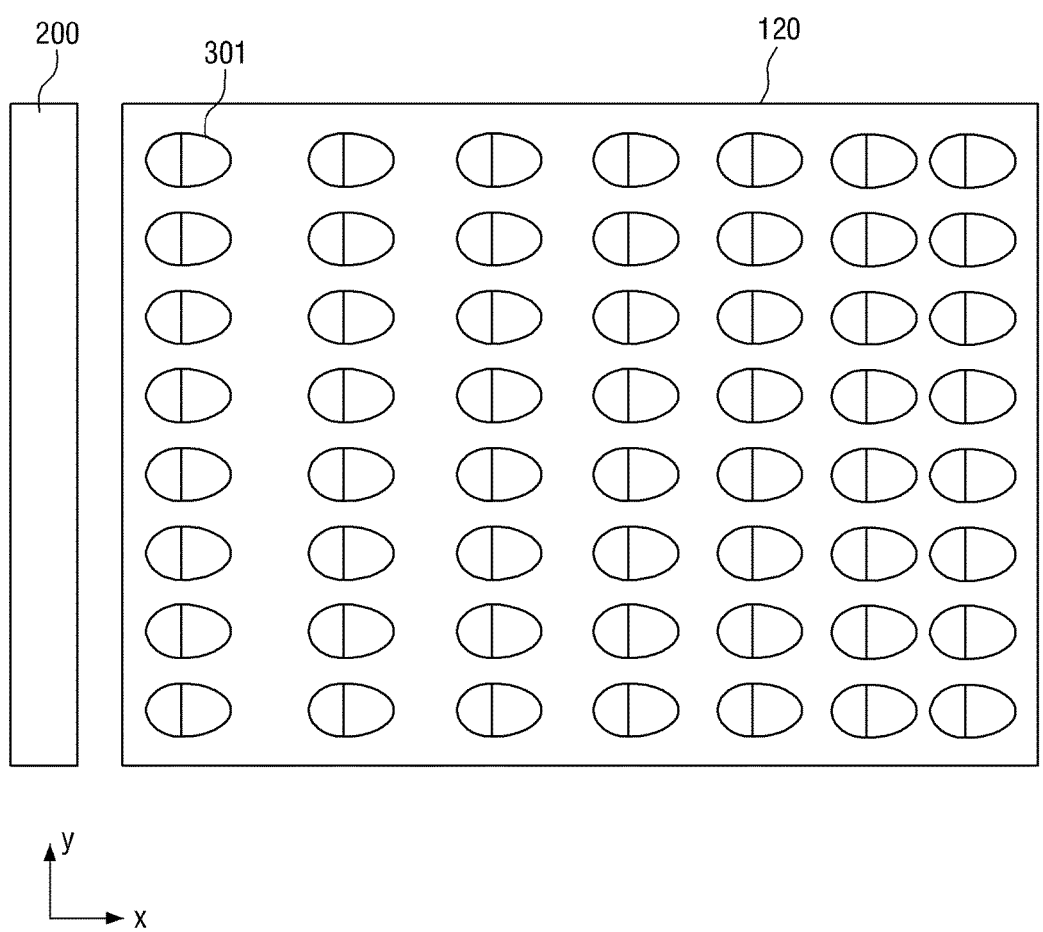
FIG. 32 is a bottom view of another exemplary embodiment of a BLU according to the invention.

FIG. 32 is a bottom view of a BLU according to another exemplary embodiment.

Referring to FIG. 32, the BLU includes a plurality of diffusion patterns 301 which is provided on a light guide panel. The diffusion patterns 301 may be more densely distributed in a distant area than in a less distant area from a light source unit 200.

More specifically, as already mentioned above, the diffusion patterns 301 may be evenly or unevenly distributed over a bottom surface 120 of the light guide panel. As already mentioned above, the diffusion patterns 301 may be arranged in a matrix including a plurality of rows and a plurality of columns. In an exemplary embodiment, more diffusion patterns 301 may be provided in a distant area than in a less distant area from the light source unit 200. That is, the diffusion patterns 301 may be more densely distributed in a distant area than in a less distant area from the light source unit 200. Accordingly, the number of diffusion patterns 301 per unit area may be greater in a distant area than in a less distant area from the light source unit 200. That is, the number of diffusion patterns 301 per unit area may increase along a direction of the positive X-axis.

Figure 33:
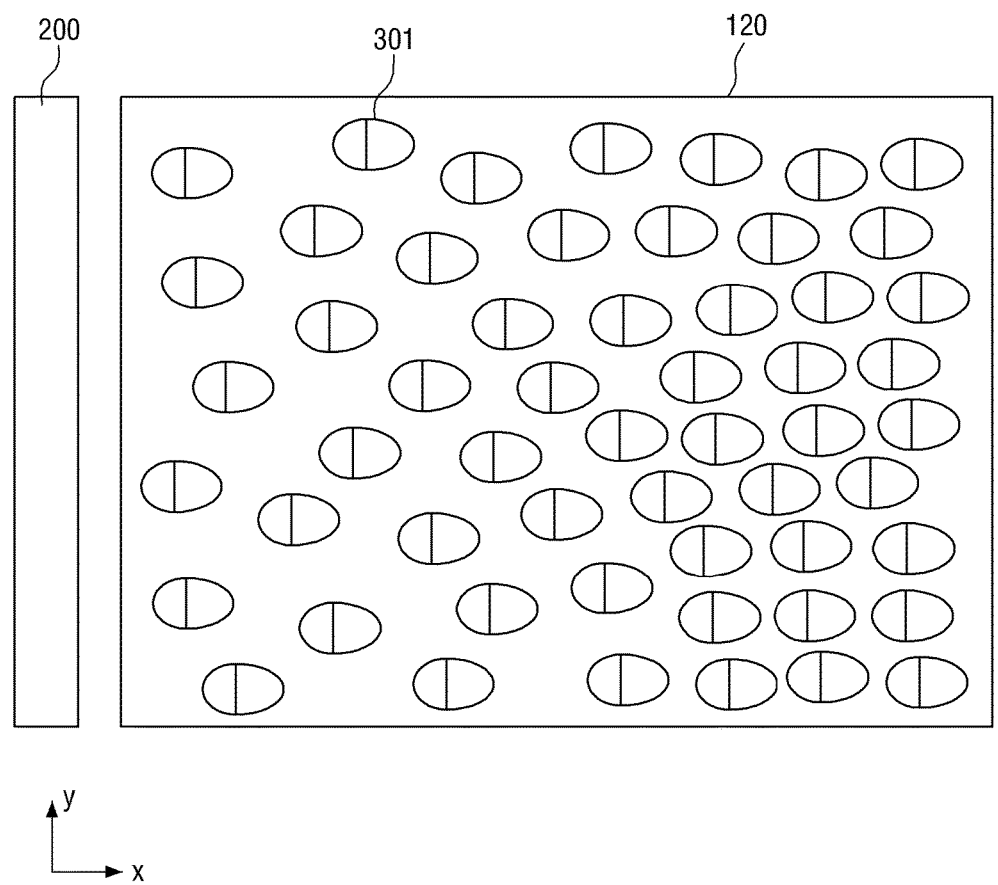
FIG. 33 is a bottom view of a modified exemplary embodiment of the BLU illustrated in FIG. 32.

FIG. 33 is a bottom view of a modified exemplary embodiment of the BLU illustrated in FIG. 32.

Referring to FIG. 33, the BLU differs from its counterpart of FIG. 32 in that a plurality of diffusion patterns 301 is unevenly distributed over a light guide panel. More specifically, as already mentioned above, the diffusion patterns 301, unlike the diffusion patterns 301 of FIG. 32, may be unevenly distributed over the light guide panel. In the exemplary embodiment of FIG. 33, like in the exemplary embodiment of FIG. 32, the number of diffusion patterns 301 per unit area may become greater in a direction from a close area to a first side surface or a light source unit 200 to a less close area to the first side surface or the light source unit 200, i.e., a direction of the positive X-axis direction.

Figure 34:
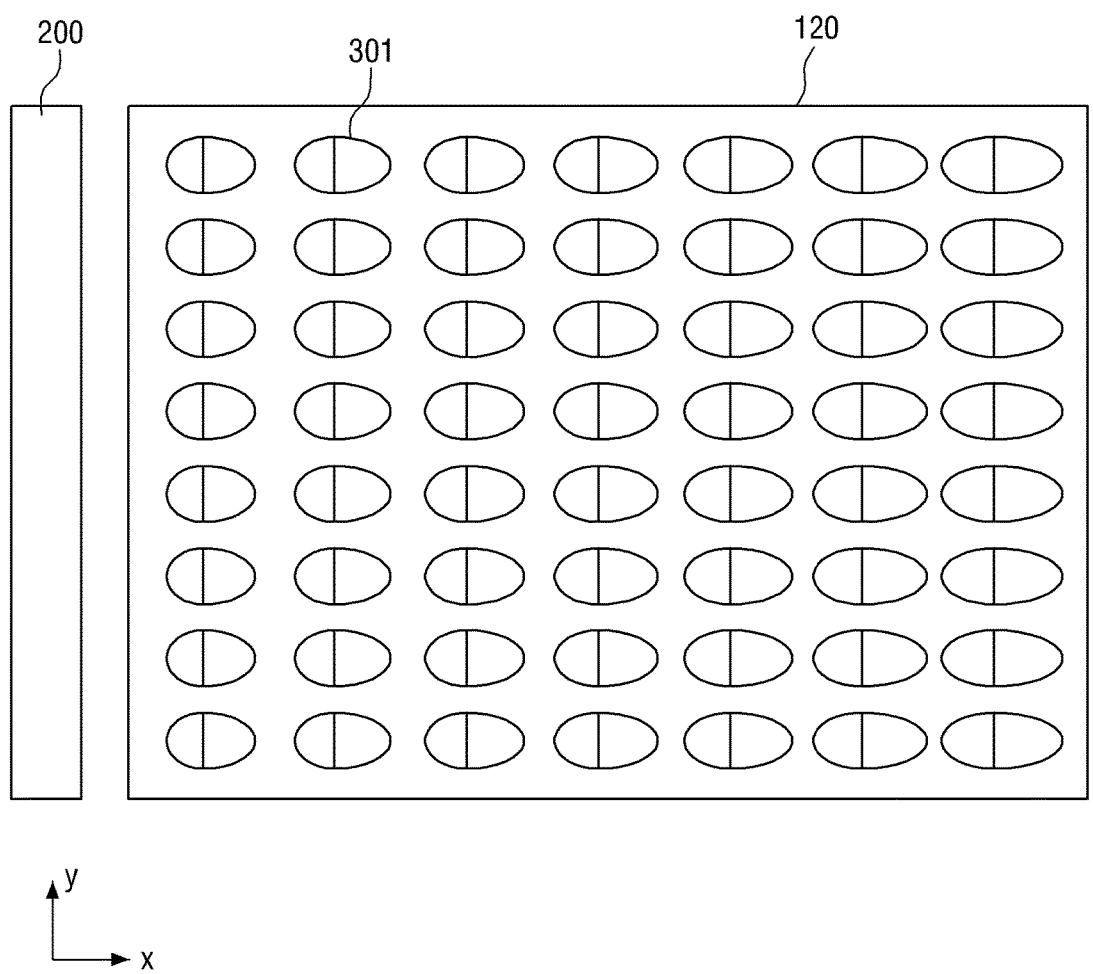
FIG. 34 is a bottom view of another modified exemplary embodiment of the BLU illustrated in FIG. 32.

FIG. 34 is a bottom view of a modified exemplary embodiment of the BLU illustrated in FIG. 32.

Referring to FIG. 34, the BLU differs from its counterpart of FIG. 32 in that a plurality of diffusion patterns 301 is provided to have different sizes.

More specifically, the diffusion patterns 301 may have different sizes. In an exemplary embodiment, the size of the diffusion patterns 301 may decrease closer to a first side surface or a light source unit 200. That is, the size of the diffusion patterns 301 may become greater along a direction of the positive X-axis direction. Accordingly, the ratio of the diffusion patterns 301 to the whole area of a bottom surface 120 of a light guide panel may become greater in the direction of the positive X-axis direction.

Figure 35:
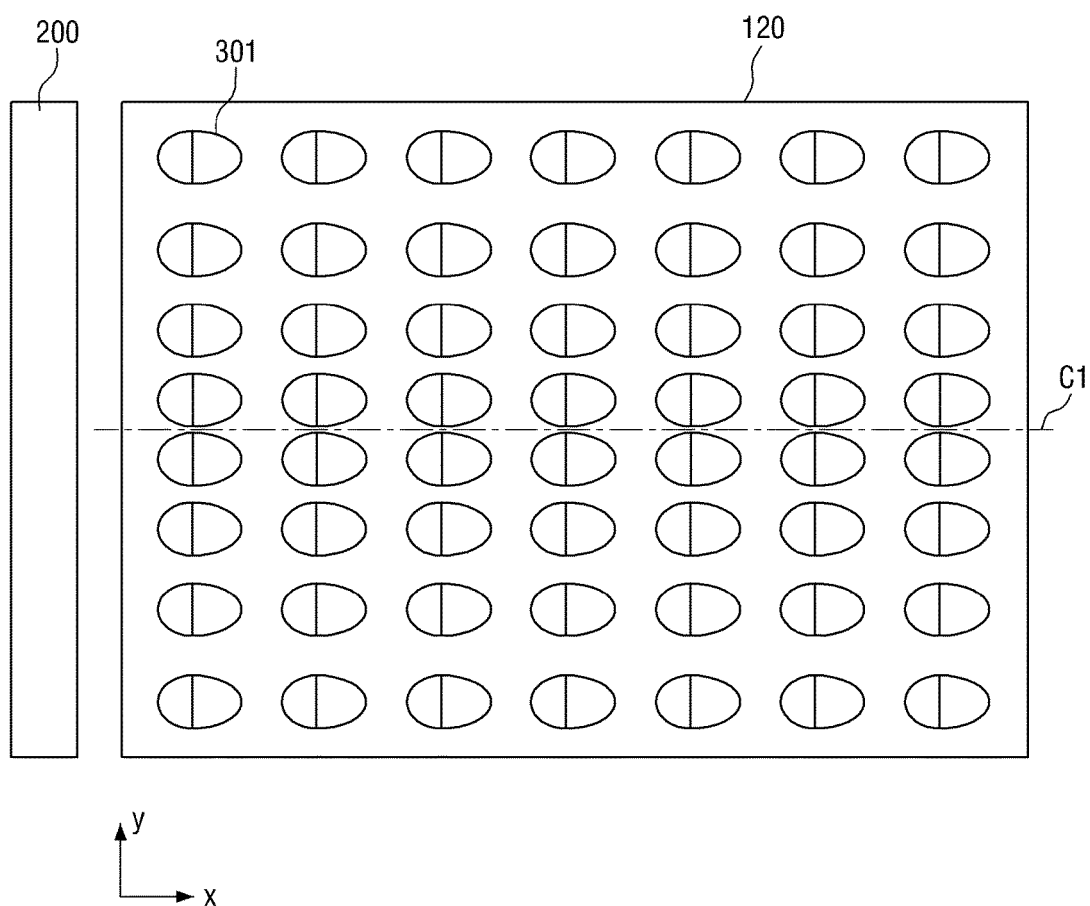
FIG. 35 is a bottom view of another modified exemplary embodiment of the BLU illustrated in FIG. 32.

FIG. 35 is a bottom view of a modified exemplary embodiment of the BLU illustrated in FIG. 32.

Referring to FIG. 35, the BLU differs from its counterpart of FIG. 32 in that the number of diffusion patterns 301 per unit area increases closer to the first central line C1.

More specifically, the first central line C1, which passes through a central part of a bottom surface 120 of a light guide panel, may be defined. The first central line C1 may extend in the X-axis direction through the center of the bottom surface 120 of the light guide panel. The number of diffusion patterns 301 may increase closer to the first central line C1. That is, the number of diffusion patterns 301 per unit area may be greater in an area near the center of the bottom surface 120 than in an area near a third side surface and a fourth side surface of the light guide panel, which are opposite to a first side surface and a second side surface, respectively, of the light guide panel.

Figure 36:
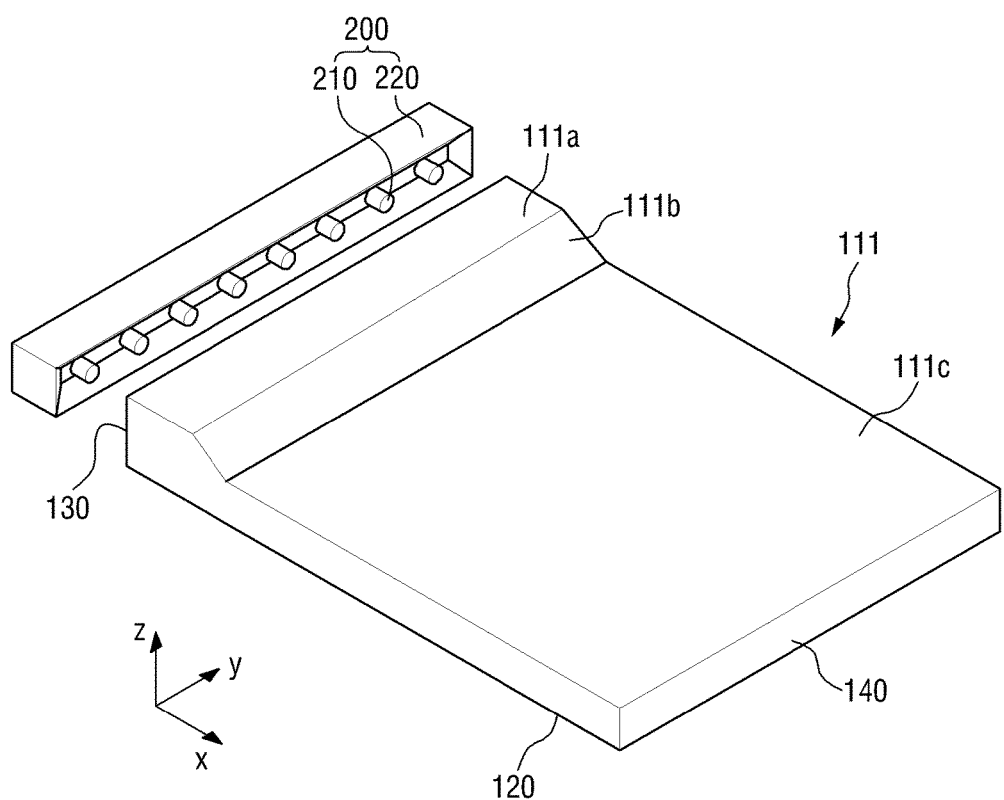
FIG. 36 is a partial perspective view of another exemplary embodiment of a BLU according to the invention.

FIG. 36 is a partial perspective view of a BLU according to another exemplary embodiment.

Referring to FIG. 36, the BLU differs from its counterpart of FIG. 27 in that a top surface 111 of a light guide panel is partially inclined.

More specifically, the top surface 111 may include a first flat surface 111*a* which extends horizontally from the upper edge of a first side surface 130, an inclined surface 111*b* which is inclined downwardly from the first flat surface 111*a*, and a second flat surface 111*c* which extends horizontally from the inclined surface 111*b*.

The second flat surface 111*c* may extend to the upper edge of a second side surface 140. In an exemplary embodiment, the width of the first side surface 130 may be different from the width of the second side surface 140. That is, the first side surface 130 may be wider than the second side surface 140.

Figure 37:
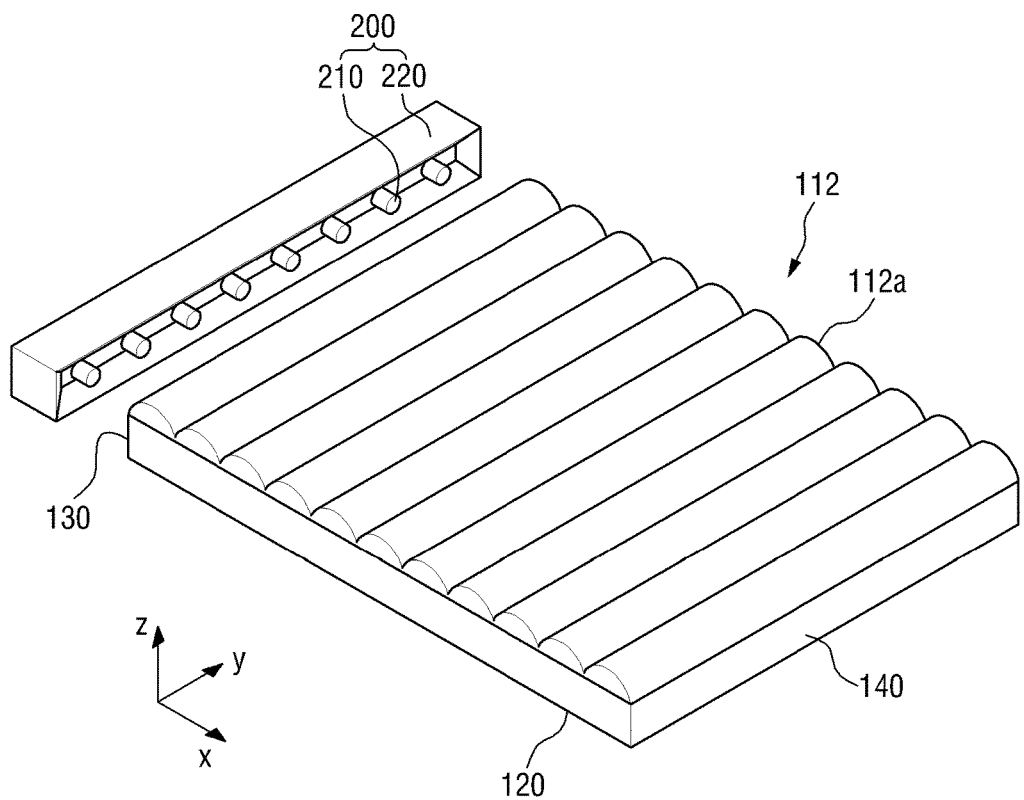
FIG. 37 is a partial perspective view of another exemplary embodiment of a BLU according to the invention.

FIG. 37 is a partial perspective view of a BLU according to another exemplary embodiment.

Referring to FIG. 37, the BLU differs from its counterpart of FIG. 27 in that a plurality of diffusion patterns 112*a* is provided on a top surface 112 of a light guide panel.

More specifically, a plurality of diffusion patterns 112*a* may be provided on the top surface 112 of the light guide panel. In an exemplary embodiment, the diffusion patterns 112*a* may be aligned side-by-side in the X-axis direction, and may extend in the Y-axis direction. That is, the diffusion patterns 112*a* may be provided as bars extending along the Y-axis direction. The diffusion patterns 112*a* are illustrated in FIG. 37 as having a semicircular cross-sectional shape, but the invention is not limited thereto. That is, in another exemplary embodiment, the diffusion patterns 112*a* may be provided to have a polygonal cross-sectional shape.

Figure 38:
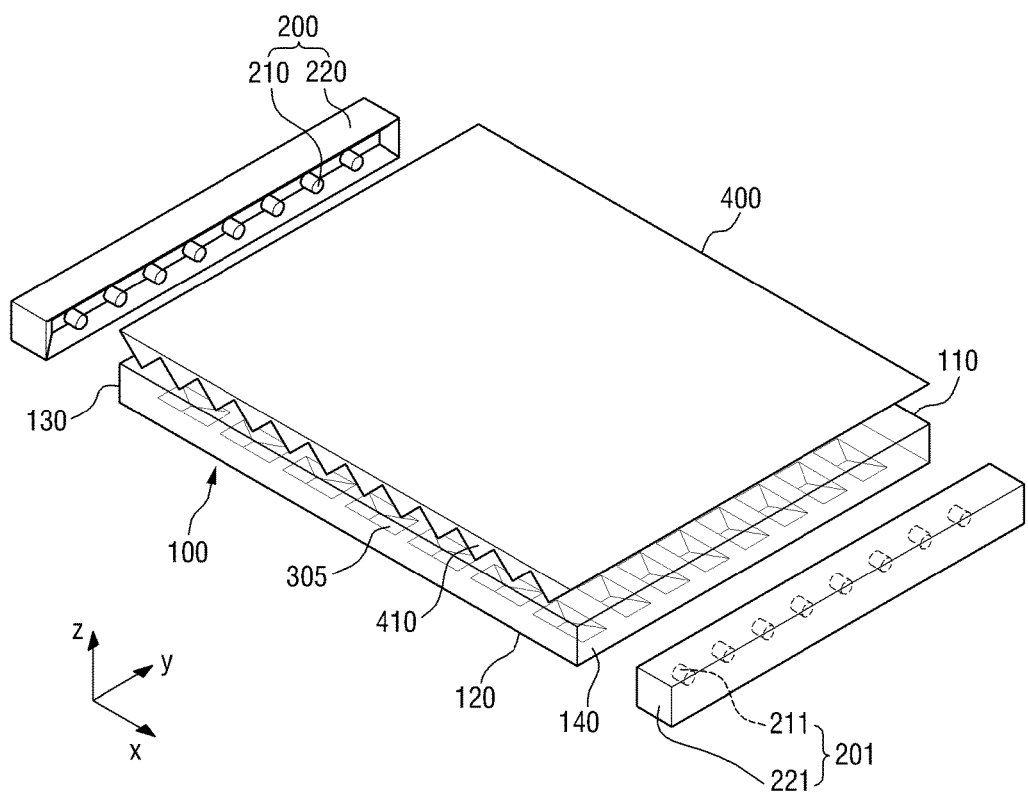
FIG. 38 is a perspective view of another exemplary embodiment of a BLU according to the invention.
Figure 39:
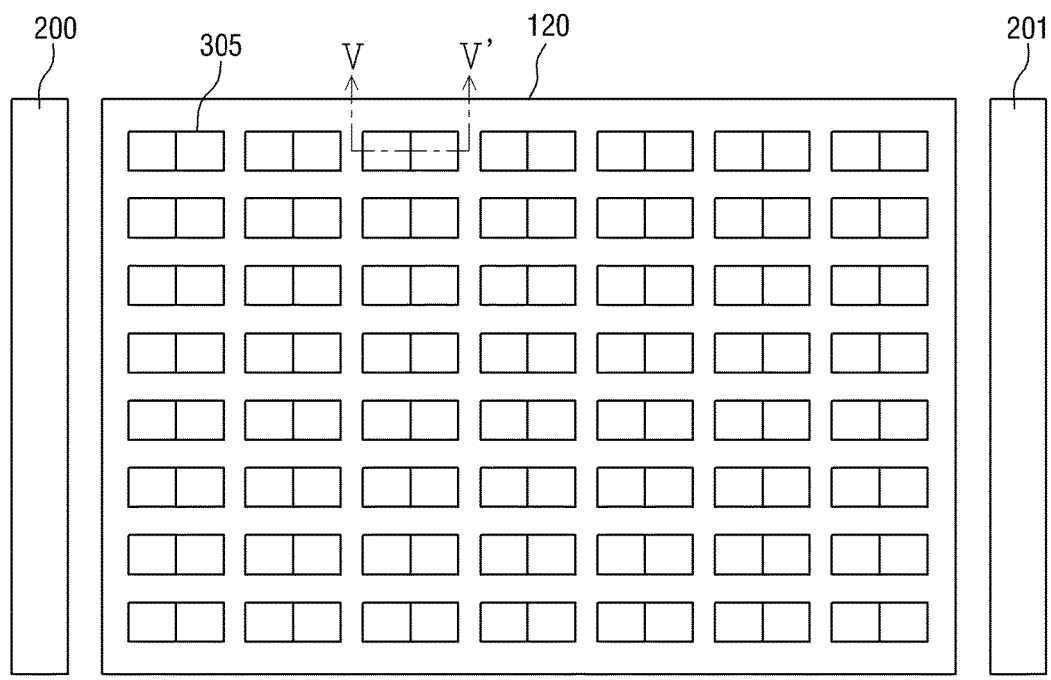
FIG. 39 is a bottom view of the BLU illustrated in FIG. 38.
Figure 40:
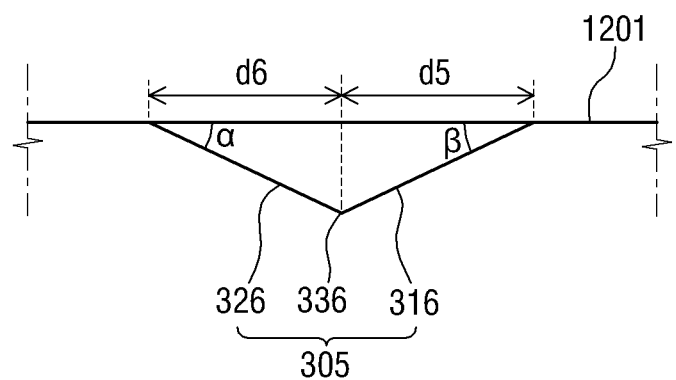
FIG. 40 is a cross-sectional view taken along line V-V' of FIG. 39.
Figure 40:
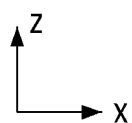

FIG. 38 is a perspective view of a BLU according to another exemplary embodiment, FIG. 39 is a bottom view of the BLU illustrated in FIG. 38, and FIG. 40 is a cross-sectional view taken along line V-V' of FIG. 39.

Referring to FIGS. 38 to 40, the BLU differs from its counterpart of FIG. 27 in that it further includes a second light source unit 201 which is disposed near a second side surface 140 of a light guide panel.

More specifically, the BLU may include two light source units 200, i.e., a first light source unit 200 which is disposed near a first side surface 130 of the light guide panel and the second light source unit 201 which is disposed near the second side surface 140.

The second light source unit 201 may include a base 221 and one or more light sources 211 provided on one side of the base 221. The second light source unit 201 may be substantially identical to the first light source unit 200, and thus, a detailed description thereof will be omitted.

In response to the BLU including two light source units 200, a plurality of diffusion patterns 305 may be provided symmetrically on a bottom surface 120 of the light guide panel.

More specifically, a first inclination angle β, which is the angle between a first inclined surface 316 and a base surface 1201, may be substantially the same as a second inclination angle α, which is the angle between a second inclined surface 326 and the base surface 1201. That is, a boundary portion 336 may be provided along the adjoining edges of the first inclined surface 326 and the second inclined surface 326.

As illustrated in FIG. 40, a horizontal distance d5 of the first inclined surface 316 may be substantially identical to a horizontal distance d6 of the second inclined surface 326. That is, the first inclined surface 316, the second inclined surface 326 and the base surface 1201 may provide the shape of an equilateral triangle in a cross section.

Figure 41:
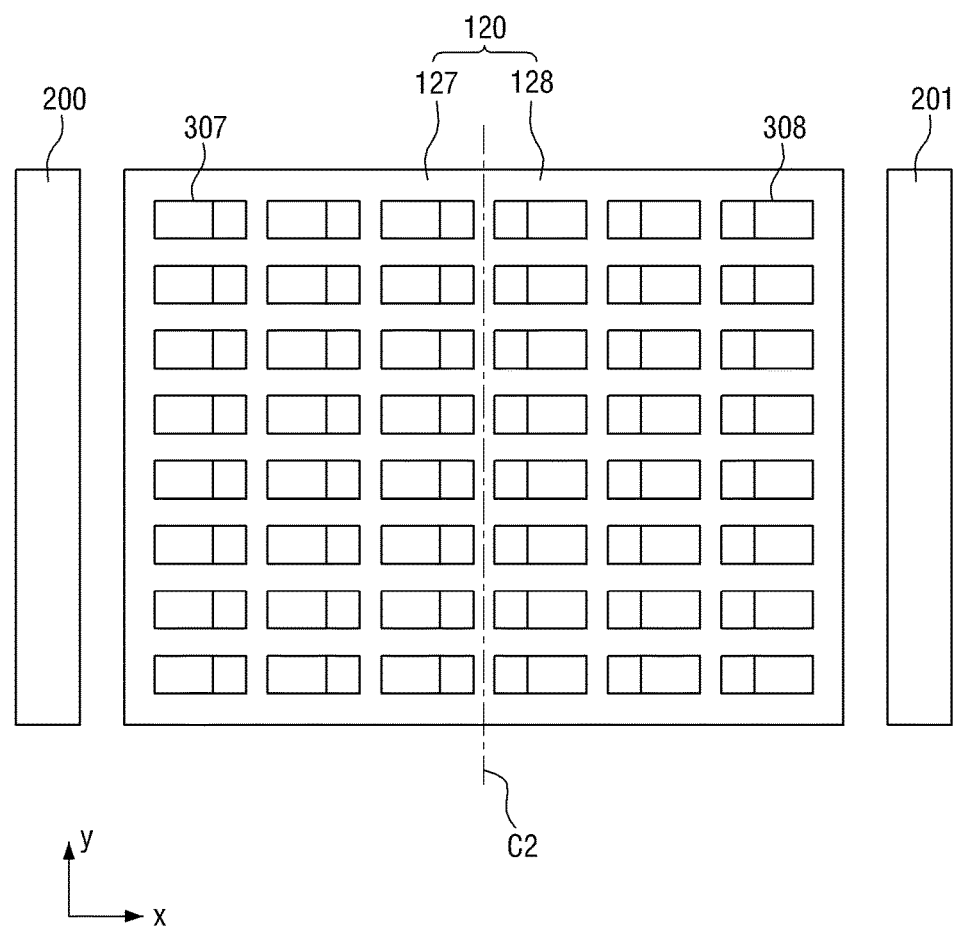
FIG. 41 is a bottom view of a modified exemplary embodiment of the BLU illustrated in FIG. 39.

FIG. 41 is a bottom view of a modified exemplary embodiment of the BLU illustrated in FIG. 39.

Referring to FIG. 41, the BLU differs from its counterpart of FIG. 39 in that a bottom to surface 120 of a light guide panel is divided into a first region 127 and a second region 128 by a second central line C2.

More specifically, the second central line C2, which extends in the Y-axis direction and divides the bottom surface 120 in half, may be defined. The bottom surface 120 of the light guide panel may be divided into the first region 127 and the second region 128 by the second central line C2.

A plurality of diffusion patterns 307 may be disposed in the first region 127, and a plurality of diffusion patterns 308 may be disposed in the second region 128. The diffusion patterns 307 and the diffusion patterns 308 may be aligned in opposite directions. That is, the first region 127 including the diffusion patterns 307 may be a mirror image of the second region 128 including the diffusion patterns 308.

In an exemplary embodiment, in response to the diffusion patterns 307 being provided as protrusions from a base surface, the second inclined surfaces of the diffusion patterns 307 may be disposed near a first side surface, and the first inclined surfaces of the diffusion patterns 307 may be disposed near the second central line C2. The relative positions of the first and second inclined surfaces of each of the diffusion patterns 307 may vary depending on whether the diffusion patterns 307 are provided as protrusions or recesses.

In order for the second region 128 to correspond to the first region 127, the second inclined surfaces of the diffusion patterns 308 may be disposed near a second side surface, and the first inclined surfaces of the diffusion patterns 308 may be disposed near the second central line C2. That is, the first inclined surfaces and the second inclined surfaces of the diffusion patterns 308 may be aligned in the opposite direction to that in which the first inclined surfaces and the second inclined surfaces of the diffusion patterns 307 are aligned.

Figure 42:
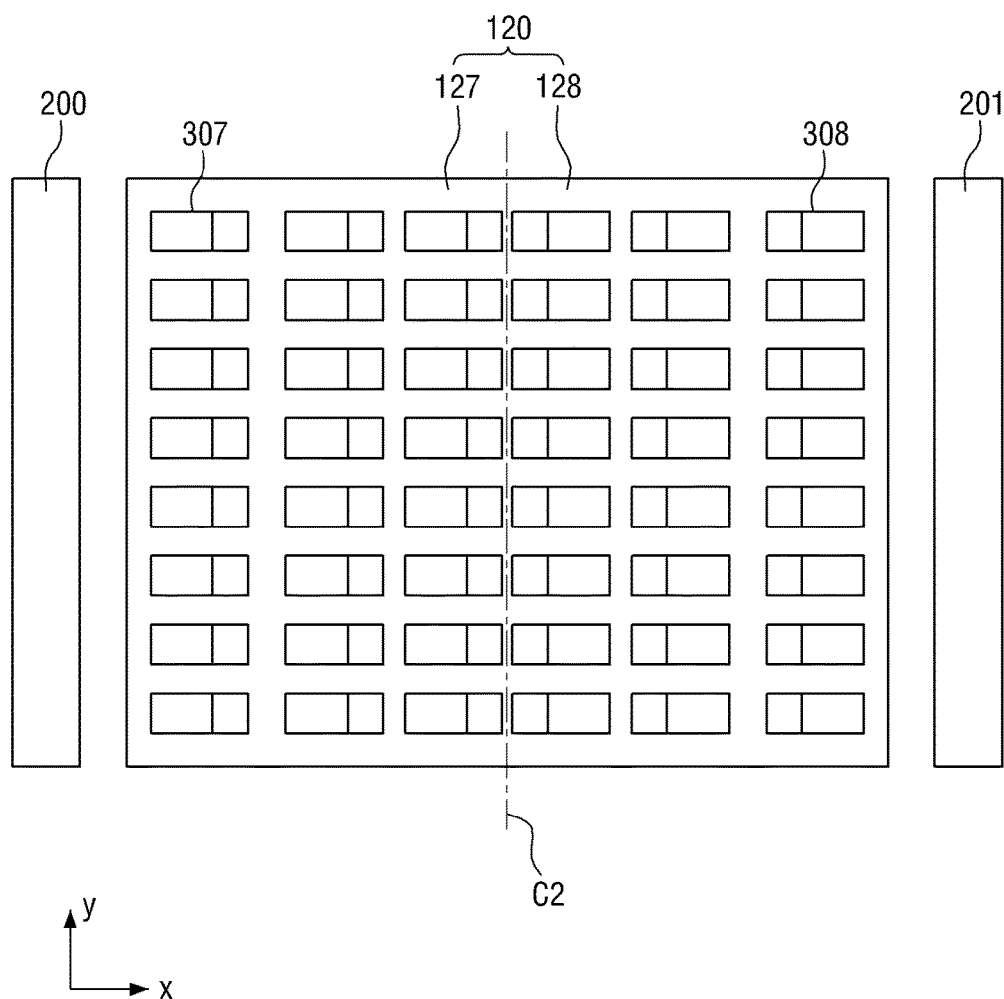
FIG. 42 is a bottom view of a modified exemplary embodiment of the BLU illustrated in FIG. 41.

FIG. 42 is a bottom view of a modified exemplary embodiment of the BLU illustrated in FIG. 41.

Referring to FIG. 42, the BLU differs from its counterpart of FIG. 41 in that the number of diffusion patterns 307 or 308 per unit area increases closer to a second central line C2.

More specifically, as already mentioned above, the density of diffusion patterns 307 or 308 may vary from one portion to another portion of a bottom surface 120 of a light guide panel. In an exemplary embodiment, the density of diffusion patterns 307 or 308 may increase closer to the second central line C2. That is, the number of diffusion patterns 307 or 308 per unit area may be greater in an area near the second central line C2 than in an area near a first side surface or a second side surface.

Figure 43:
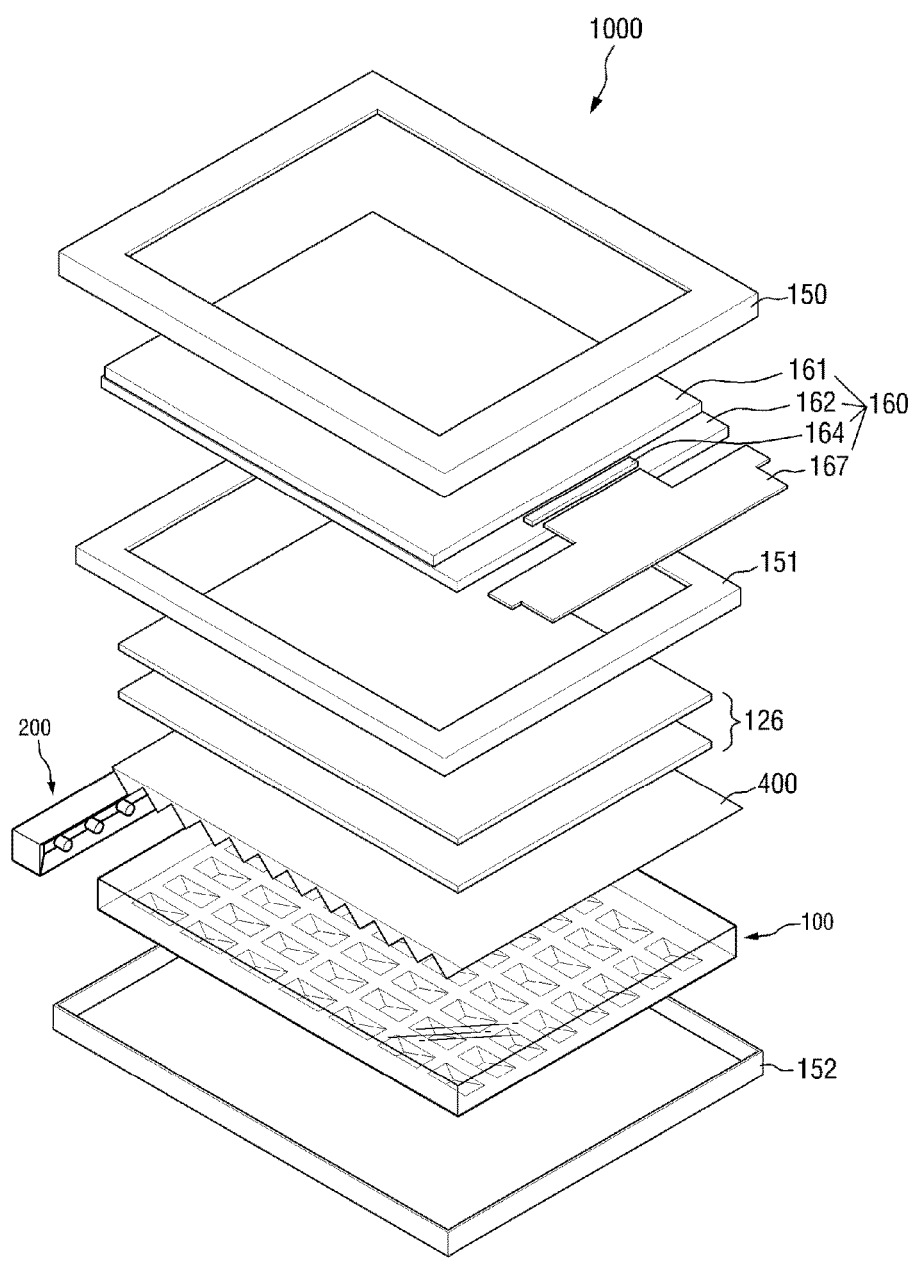
FIG. 43 is an exploded perspective view of an exemplary embodiment of a liquid crystal display ("LCD") according to the invention.

FIG. 43 is an exploded perspective view of a liquid crystal display ("LCD") according to an exemplary embodiment. Referring to FIG. 43, an LCD 1000 includes a BLU and a display panel 160 disposed on the BLU. The BLU includes a light guide panel 100, and the light guide panel 100 includes a top surface 110, which has first and second sides that extend in X- and Y-axis directions, respectively, a bottom surface 120, which is disposed opposite to the top surface 110, and a first side surface 130 and a second side surface 140 which are disposed between the top surface 110 and the bottom surface 120 and face each other, where the bottom surface 120 includes a base surface 1201 and a plurality of diffusion patterns 300 which is provided to protrude from, or to be recessed into, the base surface 1201, and each of the diffusion patterns 300 includes a first inclined surface 310 which defines a first inclination angle β with the base surface 1201 and a second inclined surface 320 which adjoins the first inclined surface 310 and defines a second inclination angle α with the base surface 1201. The BLU also includes a light source unit 200 which is disposed near the first side surface 130 of the light guide panel 100, and a prism sheet 400 which is disposed opposite to the top surface 110 of the light guide panel 100 and includes a plurality of prisms.

The BLU may be substantially identical to its counterparts from the previous exemplary embodiments, and thus, a detailed description thereof will be omitted.

The LCD 1000 may also include the display panel 160, a top chassis 150 and a bottom chassis 152. The structure of the LCD 1000 will hereinafter be described in further detail.

The display panel 160 may have a display region and a non-display region. The display panel 160 may include a first substrate 161, a second substrate 162 which is disposed opposite to the first substrate 161, a liquid crystal layer (not illustrated), and a driving unit 164 and a printed circuit board ("PCB") 167 which are attached on the first substrate 161.

The display region of the display panel 160 may be a region in which images are displayed, and the non-display region of the display panel 160 may be a region in which no images are displayed. In an exemplary embodiment, the display region may be provided in the middle of the overlapping area of the first substrate 161 and the second substrate 162, and the non-display region may be located along the boundaries of the overlapping area of the first substrate 161 and the second substrate 162. In another exemplary embodiment, the display region may correspond to a portion of the display panel 160 that is not overlapped by the top chassis 150, and the non-display region may correspond to a portion of the display panel 160 that is overlapped by the top chassis 150. The shape of the display region may be similar to the shape of the second substrate 162, and the area of the display region may be smaller than the area of the second substrate 162. The edges of the display region and the edges of the non-display region may be parallel to the sides of the second substrate 162. The boundaries between the display region and the non-display region may provide a rectangular shape.

The first substrate 161 may at least partially overlap the second substrate 162. A central part of the overlapping area of the first substrate 161 and the second substrate 162 may correspond to the display region, and a boundary portion of the overlapping area of the first substrate 161 and the second substrate 162 may correspond to the non-display region. The driving unit 164 and the PCB 167 may be attached onto a portion of the display panel 160 not overlapped by the first substrate 161 and the second substrate 162.

The second substrate 162 may be disposed opposite to the first substrate 161. The liquid crystal layer may be interposed between the first substrate 161 and the second substrate 162. A sealing member (not illustrated) such as a sealant may be disposed along the edges of the first substrate 161 and the second substrate 162 so that the first substrate 161 and the second substrate 162 may be bonded and sealed together.

In an exemplary embodiment, the first substrate 161 and the second substrate 162 may both be rectangular, but are not limited to a rectangular shape. That is, the first substrate 161 and the second substrate 162 may be provided in various shapes, other than a rectangular shape, according to the shape of the display panel 160.

The driving unit 164 may apply various signals (such as a driving signal) for driving an image in the display region. The PCB 167 may output various signals to the driving unit 164.

One or more optical sheets 126, the BLU and the bottom chassis 152 may be disposed on the bottom surface of the display panel 160. More specifically, the optical sheets 126 may be disposed on the BLU, and the bottom chassis 152 may be disposed below the BLU.

The optical sheets 126, which modulate the optical properties of light emitted from the BLU, and a mold frame 151, which accommodates the optical sheets 126 therein, may be disposed on the BLU.

The mold frame 151 may support and fix the display panel 160 by being placed in contact with the edges of the bottom surface of the display panel 160. In an exemplary embodiment, a boundary portion of the bottom surface of the display panel 160 may correspond to the non-display region. That is, the mold frame 151 may at least partially overlap the non-display region of the display panel 160.

The top chassis 150 may cover the edges of the display panel 160 and surround the sides of the display panel 160. The bottom chassis 152 may accommodate the optical sheets 126 and the BLU therein. In an exemplary embodiment, the top chassis 150 and the bottom chassis 152 may both include a conductive material, for example, a metal.

Other exemplary embodiments will hereinafter be described. With respect to the description that follows, like reference numerals indicate like elements, and thus, detailed descriptions thereof will be omitted.

Figure 44:
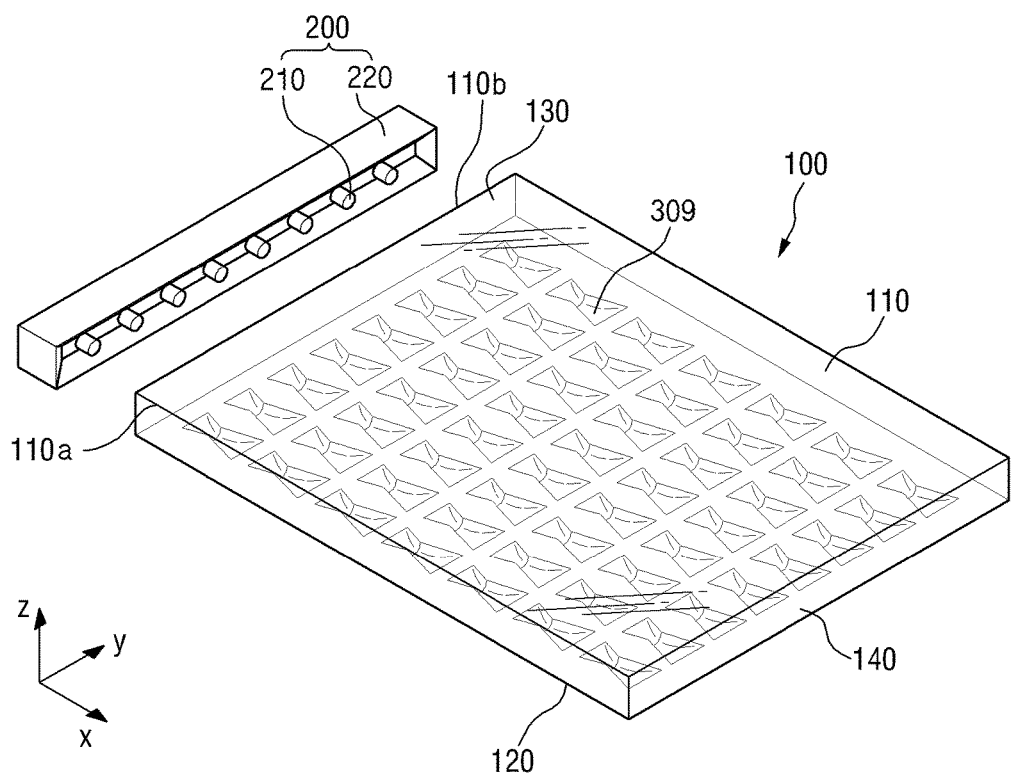
FIG. 44 is a perspective view of an exemplary embodiment of a light guide panel according to the invention.
Figure 45:
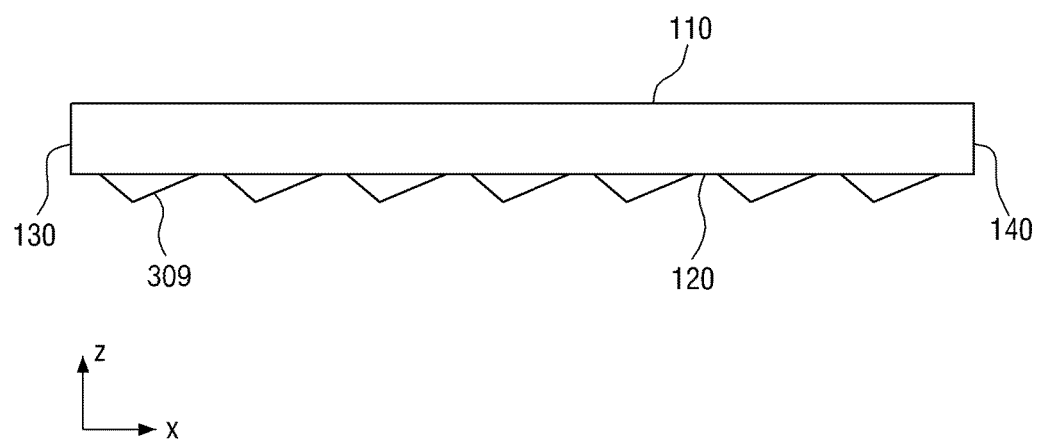
FIG. 45 is a cross-sectional view of the light guide panel illustrated in FIG. 44.
Figure 46:
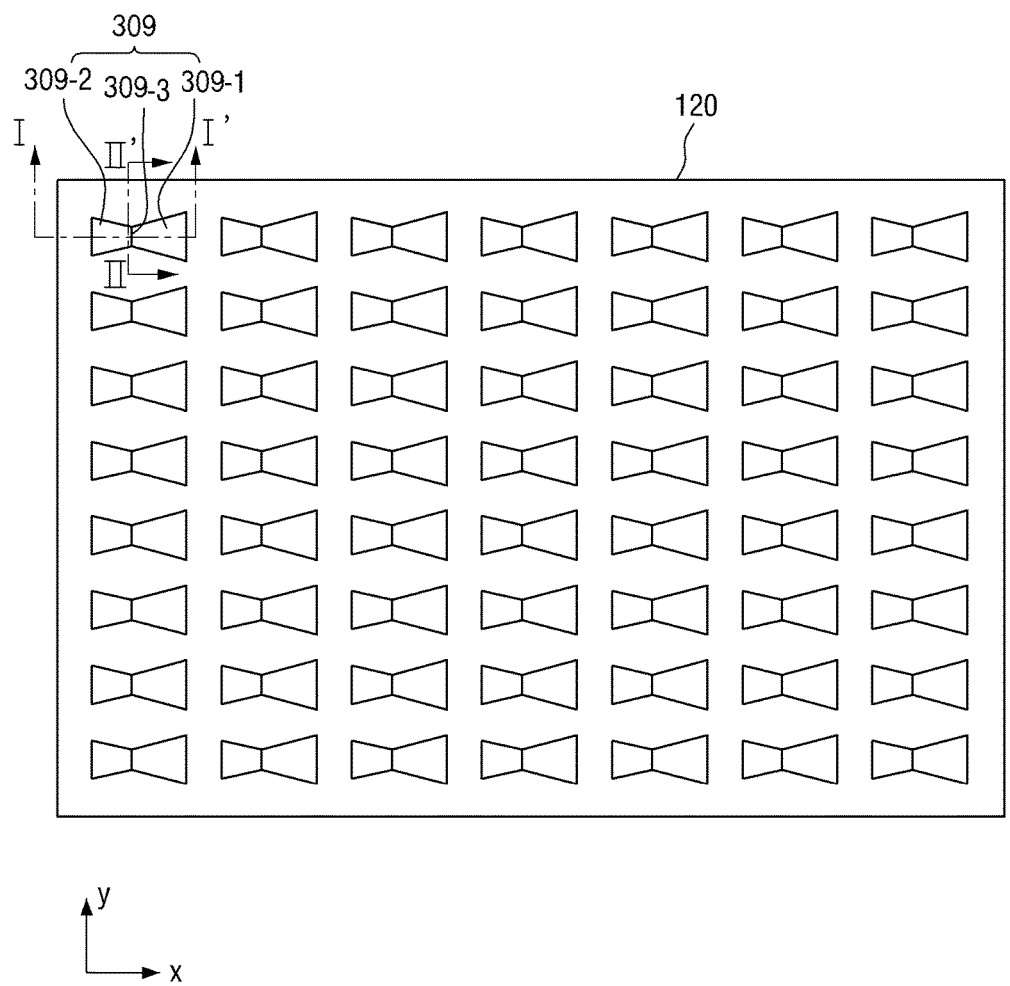
FIG. 46 is a bottom view of the light guide panel illustrated in FIG. 44.

FIG. 44 is a perspective view of a light guide panel according to an exemplary embodiment, FIG. 45 is a cross-sectional view of the light guide panel illustrated in FIG. 44, and FIG. 46 is a bottom view of the light guide panel illustrated in FIG. 44.

Referring to FIGS. 44 and 46, a light guide panel 100 includes a top surface 110, which has first and second sides that extend in X- and Y-axis directions, respectively, a bottom surface 120, which is disposed opposite to the top surface 110, and a first side surface 130 and a second side surface 140 which are disposed between the top surface 110 and the bottom surface 120 and face each other. The bottom surface 120 includes a base surface 1201 and a plurality of diffusion patterns 309 which is provided to protrude from, or to be recessed into, the base surface 1201. Each of the diffusion patterns 309 includes a first inclined surface 309_1 which defines a first inclination angle β with the base surface 1201 and a second inclined surface 309_2 which adjoins the first inclined surface 309_1 and defines a second inclination angle α with the base surface 1201.

The top surface 110 may extend in a horizontal direction. The top surface 110 is illustrated in FIG. 44 as being a flat surface, but is not limited to the shape as illustrated in FIG. 44. That is, one or more patterns with a particular shape may be disposed on the top surface 110, or the top surface 110 may be partially inclined.

In an exemplary embodiment, the top surface 110 may be rectangular. That is, the top surface 110 may have four sides including a first side 110a extending in the X-axis direction and a second side 110b extending in the Y-axis direction. The second side 110b may be a tangent line to the first side surface 130 or the second side surface 140.

The bottom surface 120 may be disposed opposite to the top surface 110. The bottom surface 120 may have the same shape as the top surface 110. That is, the top surface 110 and the bottom surface 120 may be parallel to each other, extend in the horizontal direction, have substantially the same shape, and face each other. In a non-limiting exemplary embodiment, the top surface 110 and the bottom surface 120 may both be rectangular.

The first side surface 130 and the second side surface 140 may be disposed between the top surface 110 and the bottom surface 120. The upper edges of the first side surface 130 and the second side surface 140 may adjoin the top surface 110, and the lower edges of the first side surface 130 and the second side surface 140 may adjoin the bottom surface 120. That is, the top surface 110 and the bottom surface 120 may be the base sides of a cube or a cuboid, and the first side surface 130 and the second side surface 140 may be a pair of parallel sides of the cube or the cuboid.

At least one of the first side surface 130 and the second side surface 140 may be disposed within a vicinity of a light source unit 200, and this will be described later in further detail.

The first side surface 130 and the second side surface 140 are illustrated in FIG. 44 as having the same width, but may have different widths from each other in another exemplary embodiment. The first side surface 130 and the second side surface 140 are illustrated in FIG. 44 as being flat surfaces, but may include one or more patterns with a particular shape provided thereon. In an exemplary embodiment, the first side surface 130 or the second side surface 140 may partially include rugged portions.

The bottom surface 120 may include the base surface 1201 and one or more diffusion patterns 309 which protrude from or are recessed into the base surface 1201.

The base surface 1201 may be a flat surface and may be a basis for making a determination as to whether the diffusion patterns 309 are provided as protrusions or recesses.

One or more diffusion patterns 309 may be provided on the bottom surface 120. The diffusion patterns 309 may be arranged in a matrix, but the invention is not limited thereto. That is, in another exemplary embodiment, the diffusion patterns 309 may be unevenly distributed on the bottom surface 120. The diffusion patterns 309 may have substantially the same size, but the invention is not limited thereto. That is, in another exemplary embodiment, the diffusion patterns 309 may have different sizes.

The diffusion patterns 309 may be provided to protrude from, or to be recessed into, the base surface 1201. More specifically, the diffusion patterns 309 may protrude downward from the reference surface 1201 or may be recessed upwardly into the reference surface 1201 to face the top surface 110. The diffusion patterns 309 will be described later in further detail.

The light guide panel 100 including the top surface 110, the bottom surface 120, the first side surface 130 and the second side surface 140 may include a transparent material. The term "transparent", as used herein, may mean both complete transparency and semi-transparency.

The light guide panel 100 may be provided to be transparent by using, for example, polycarbonate ("PC") or, polymethyl methacrylate ("PMMA"), but the invention is not limited thereto.

In an exemplary embodiment, the light guide panel 100 may have flexibility. The flexibility of the light guide panel 100 may be determined by the thickness, shape and material of the light guide panel 100, but the invention is not limited thereto.

The diffusion patterns 309 will hereinafter be described in further detail with reference to FIGS. 47 to 49.

Figure 47:
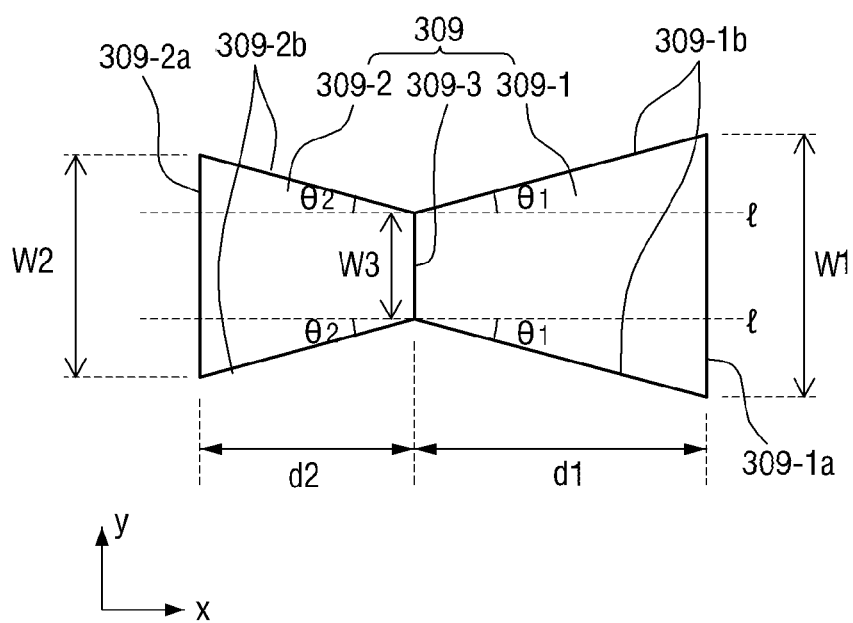
FIG. 47 is a partial enlarged view of the light guide panel illustrated in FIG. 44.
Figure 48:
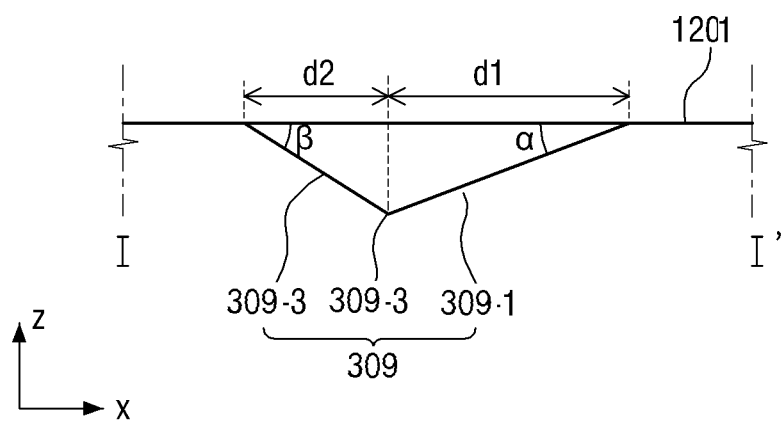
FIG. 48 is a cross-sectional view taken along line I-I' of FIG. 46.
Figure 49:
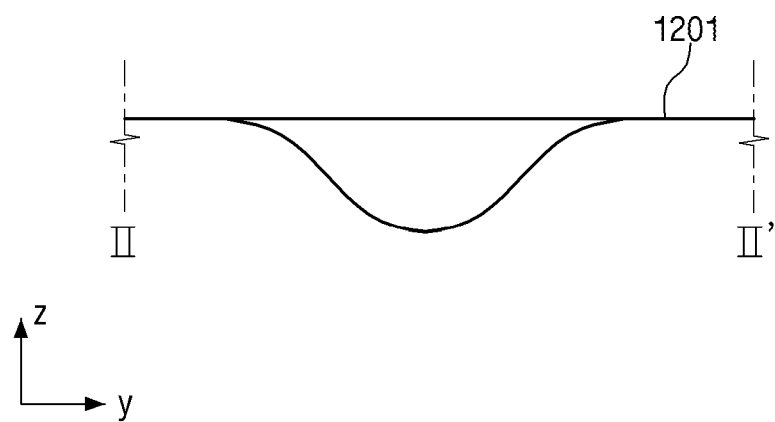
FIG. 49 is a cross-sectional view taken along line II-II' of FIG. 46.

FIG. 47 is a partial enlarged view of the light guide panel illustrated in FIG. 44, FIG. 48 is a cross-sectional view taken along line I-I' of FIG. 46, and FIG. 49 is a cross-sectional view taken along line II-II' of FIG. 46.

Referring to FIGS. 47 to 49, a diffusion pattern 309 may include a first inclined surface 309_1 and a second inclined surface 309_2. For convenience, assume that the diffusion pattern 309 is provided to protrude from the base surface 1201. An exemplary embodiment in which the diffusion pattern 309 is provided to be recessed into the base surface 1201 will be described later in detail.

The first inclined surface 309_1 and the second inclined surface 309_2 may be disposed side-by-side in the X-axis direction. That is, the second inclined surface 309_2 may be disposed near the first side surface 130, and the first inclined surface 309_1 may be disposed near the second side surface 140. More specifically, in response to the light source unit 200 being disposed near the first side surface 130, the second inclined surface 309_2 may be disposed near the first side surface 130, and the first inclined surface 309_1 may be disposed near the second side surface 140.

The first inclined surface 309_1 and the second inclined surface 309_2 may be inclined downwardly from the base surface 1201 in a cross section. More specifically, as illustrated in FIG. 48, the first inclined surface 309_1 and the second inclined surface 309_2 may be inclined downwardly from the base surface 1201, and may then adjoin each other. That is, a boundary portion 309_3 may be provided along the adjoining edges of the first inclined surface 309_1 and the second inclined surface 309_2. The boundary portion 309_3 may be formed in the shape of a line extending in the Y-axis direction.

Accordingly, the diffusion pattern 309 may have a triangular cross-sectional shape, and the first inclined surface 309_1 and the second inclined surface 309_2 may provide two sides of the triangular cross-sectional shape.

The first inclined surface 309_1 may define a first inclination angle $\beta$ with the base surface 1201, and the second inclined surface 309_2 may define a second inclination angle $\alpha$ with the base surface 1201. That is, the first inclination angle $\beta$ and the second inclination angle $\alpha$ may be two internal angles of the triangular cross-sectional shape illustrated in FIG. 48.

In an exemplary embodiment, the first inclination angle $\beta$ may be smaller than the second inclination angle $\alpha$. In the exemplary embodiment, a horizontal distance d1 of the first inclined surface 309_1 may be greater than a horizontal distance d2 of the second inclined surface 309_2.

In an exemplary embodiment, the first inclination angle $\beta$ may range from about 1.8 degrees (°) to about 5.7°.

In an exemplary embodiment, light emitted forward from the light guide panel 100 through the top surface 110 may have more excellent brightness properties when the first inclination angle $\beta$ is within the range of about 1.8° to about 5.7° than when the first inclination angle $\beta$ is out of the range. In an exemplary embodiment, the first inclination angle $\beta$ may be about 3.3°. In the exemplary embodiment, the brightness of light emitted forward from the light guide panel 100 through the top surface 110 reaches its maximum. That is, the smaller the first inclination angle $\beta$, the higher the light concentration level, and the lower the total flux. That is, a light concentration level and total flux have opposite effects on the brightness of light emitted forward from the light guide panel 100. Accordingly, it is important to appropriately determine the first inclination angle $\beta$ and thus to strike a balance between a light concentration level and total flux. In an exemplary embodiment, a desired forward-emitted light brightness can be obtained when the first inclination angle $\beta$ is within the range of about 1.8° to about 5.7°, and particularly, is about 3.3°.

In an exemplary embodiment, the first inclined surface 309_1 and the second inclined surface 309_2 may be bowtie-shaped in a plan view. That is, the diffusion pattern 309 may be bowtie-shaped in a plan view. For convenience, a side of the first inclined surface 309_1 extending in the Y-axis direction and a side of the second inclined surface 309_2 extending in the Y-axis direction will hereinafter be referred to as a first side 309_1a and a first side 309_2a, respectively, and a pair of sides of the first inclined surface 309_1 extending at an inclination with respect to the X-axis direction and a pair of sides of the second inclined surface 309_2 extending at an inclination with respect to the X-axis direction will hereinafter be referred to as second sides 309_1b and second sides 309_2b, respectively. The first sides 309_1a and 309_2a may be the distal sides of the first and second inclined surfaces 309_1 and 309_2, respectively, from a boundary portion 309_3 between the first and second inclined surfaces 309_1 and 309_2.

The first side 309_1a of the first inclined surface 309_1 may be parallel to, and may face, the first side 309_2a of the second inclined surface 309_2. That is, as illustrated in FIG. 47, each of the first inclined surface 309_1 and the second inclined surface 309_2 may be defined by one first side (i.e., 309_1a or 309_2a), two second sides (i.e., 309_1b or 309_2b), and the boundary portion 309_3.

The width of the first inclined surface 309_1 may gradually decrease from the first side 309_1a to the boundary portion 309_3. Similarly, the width of the second inclined surface 309_2 may gradually decrease from the first side 309_2a to the boundary portion 309_3.

In an exemplary embodiment, the second sides 309_1b may connect the first side 309_1a and the boundary portion 308_3, and the second sides 309_2b may connect the first side 309_2a and the boundary portion 309_3. In an exemplary embodiment, the second sides 309_1b and the second sides 309_2b may be straight line-shaped, but the invention is not limited thereto. That is, the second sides 309_1b and the second sides 309_2b may be partially curved.

The second sides 309_1b and the second sides 309_2b may form a predetermined angle with a reference line 1 that extends in the X-axis direction. For convenience, the angle between the second sides 309_1b of the first inclined surface 309_1 and the angle between the second sides 309_2b of the second inclined surface 309_2 will hereinafter be referred to as a first angle $\theta 1$ and a second angle $\theta 2$, respectively. In an exemplary embodiment, the second sides 309_1b of the first inclined surface 309_1 may form substantially the same angle, i.e., the first angle $\theta 1$, with the reference line 1, and the second sides 300 2b of the second inclined surface 300_2 may form substantially the same angle, i.e., the second angle $\theta 2$, with the reference line 1.

In an exemplary embodiment, the first angle $\theta 1$ may be substantially the same as the second angle $\theta 2$, but the invention is not limited thereto.

The first angle $\theta 1$ and the second angle $\theta 2$ may range from about 1 degree to about 90 degrees.

The width of the first inclined surface 309_1 or the second inclined surface 309_2 may gradually decrease from the first side 309_1a or 309_2a to the boundary portion 309_3. That is, a width w3 of the first inclined surface 309_1 or the second inclined surface 309_2 at the boundary portion 309_3 may be relatively smaller than a width w1 or w2 of the first inclined surface 309_1 or the second inclined surface 309_2 at the first side 309_1a or 309_2a.

In other words, the first inclined surface 309_1 and the second inclined surface 309_2 may be formed in such a shape that they gradually converge toward the boundary portion 309_3. As already described above, the first side 309_1a of the first inclined surface 309_1 and the first side 309_2a of the second inclined surface 309_2 may face each other, and may extend in parallel to each other. In an exemplary embodiment, a horizontal distance d1 of the first inclined surface 309_1 may be relatively greater than a horizontal distance d2 of the second inclined surface 309_2. In this exemplary embodiment, the width w1 of the first inclined surface 309_1 at the first side 309_1a may be greater than the width w2 of the second inclined surface 309_2 at the first side 309_2a.

The cross section, along line II-II' of FIG. 47, of the diffusion pattern 309 may have a downwardly-curved parabolic shape (refers to FIG. 49). That is, the cross section, along the Y-axis direction, of the diffusion pattern 309 may have a downwardly-curved parabolic shape. In other words, the diffusion pattern 309 may include a recess with a curved circumference Other exemplary embodiments will hereinafter be described. With respect to the description that follows, like reference numerals indicate like elements, and thus, detailed descriptions thereof will be omitted.

Figure 50:
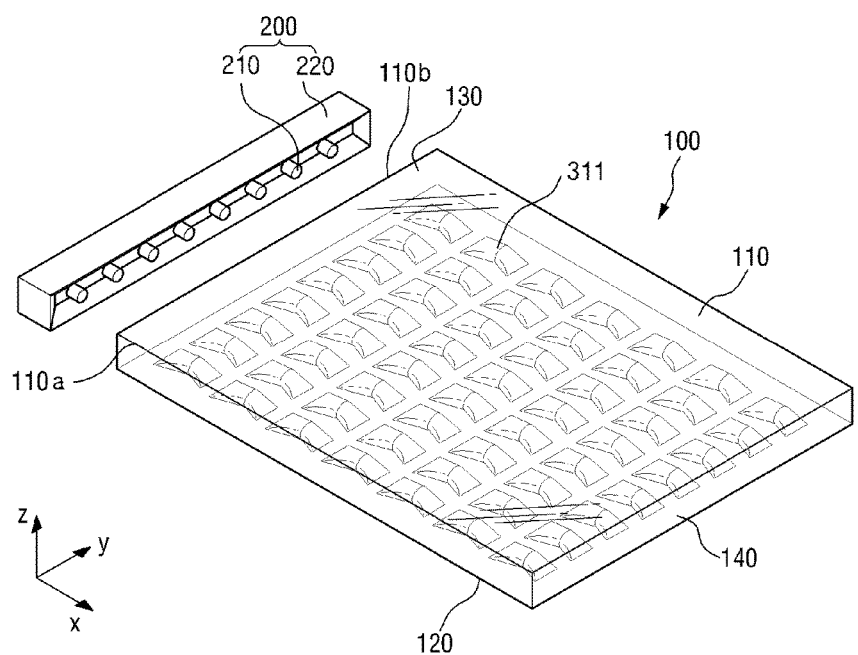
FIG. 50 is a perspective view of another exemplary embodiment of a light guide panel according to the invention.
Figure 51:
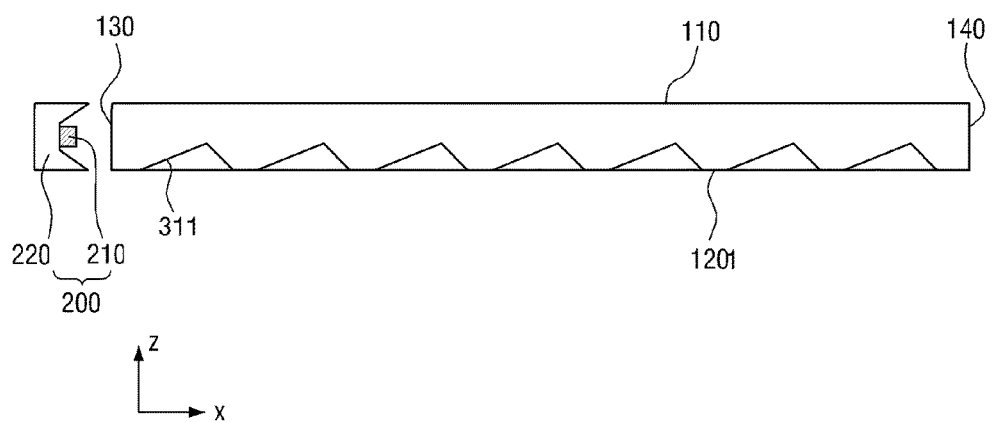
FIG. 51 is a cross-sectional view of a light guide panel illustrated in FIG. 50.
Figure 52:
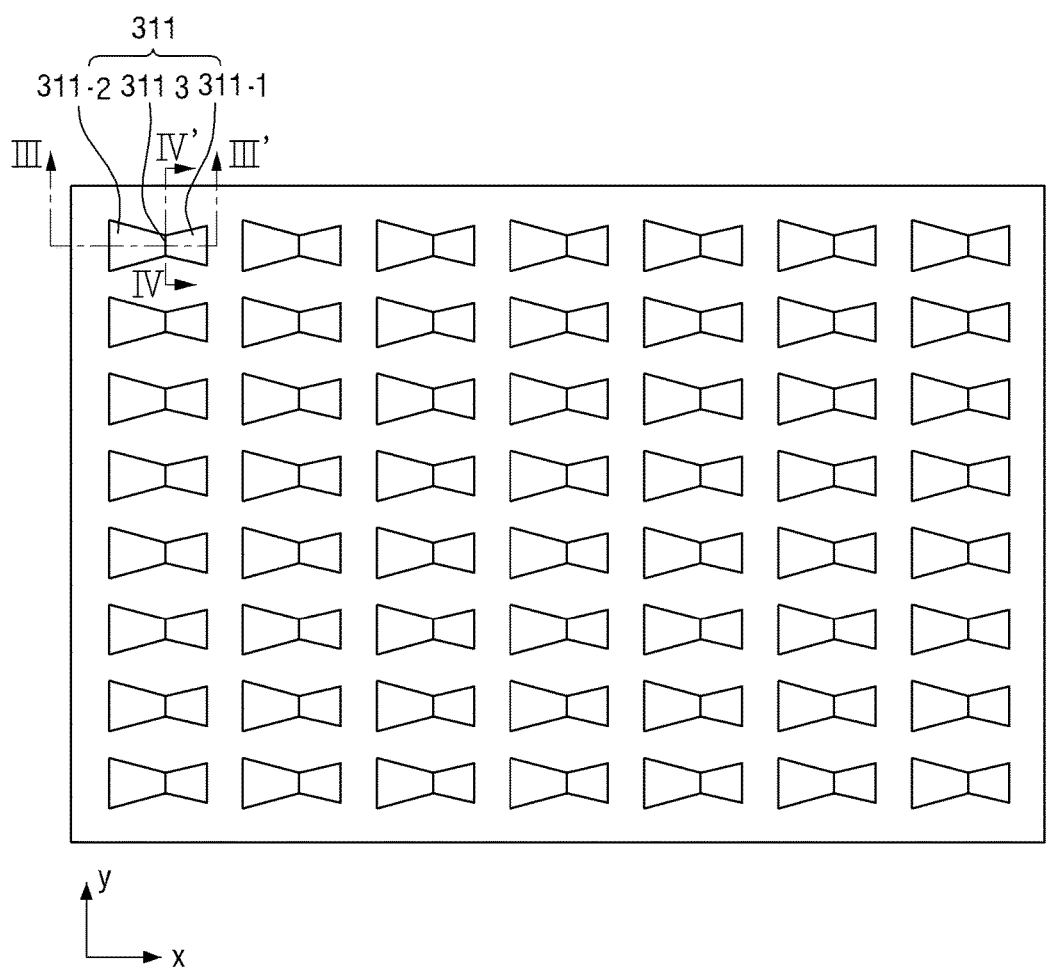
FIG. 52 is a bottom view of the light guide panel illustrated in FIG. 50.

FIG. 50 is a perspective view of a light guide panel according to another exemplary embodiment, FIG. 51 is a cross-sectional view of the light guide panel illustrated in FIG. 50, and FIG. 52 is a bottom view of the light guide panel illustrated in FIG. 52.

Referring to FIGS. 50 to 52, diffusion patterns 311 may be provided to be recessed into the base surface 1201 of a bottom surface 120 toward a top surface 110.

As already discussed above, the base surface 1201 may be a basis for making a determination as to whether the diffusion patterns 311 are provided as protrusions or recesses.

One or more diffusion patterns 311 may be provided on the bottom surface 120. The diffusion patterns 311 may be arranged in a matrix, but the invention is not limited thereto. That is, in another exemplary embodiment, the diffusion patterns 311 may be unevenly distributed on the bottom surface 120. The diffusion patterns 311 may have substantially the same size, but the invention is not limited thereto. That is, in another exemplary embodiment, the diffusion patterns 311 may have different sizes.

The diffusion patterns 311 may be provided to protrude from, or to be recessed into, the base surface 1201. An exemplary embodiment in which the diffusion patterns 311 are provided to be recessed into the base surface 1201 will be described later in detail.

The shape of the diffusion patterns 311 will hereinafter be described in further detail with reference to FIGS. 53 to 55.

Figure 53:
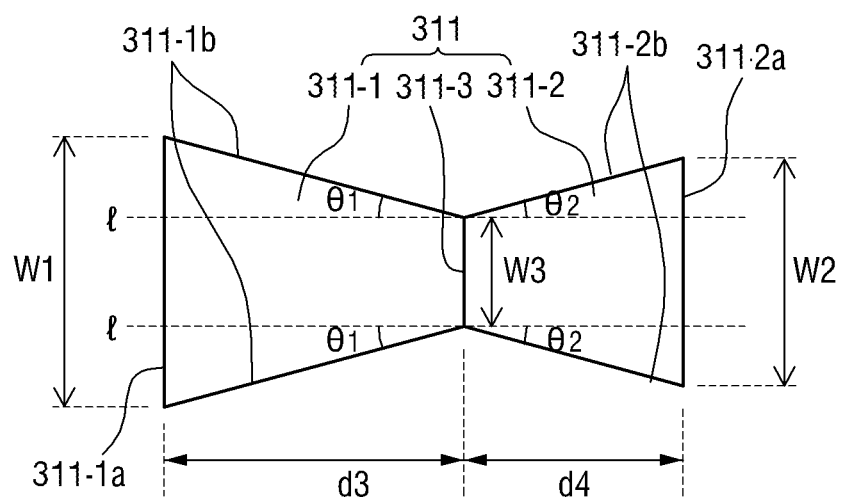
FIG. 53 is a partial enlarged view of the light guide panel illustrated in FIG. 52.
Figure 53:
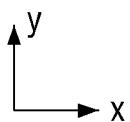
Figure 54:
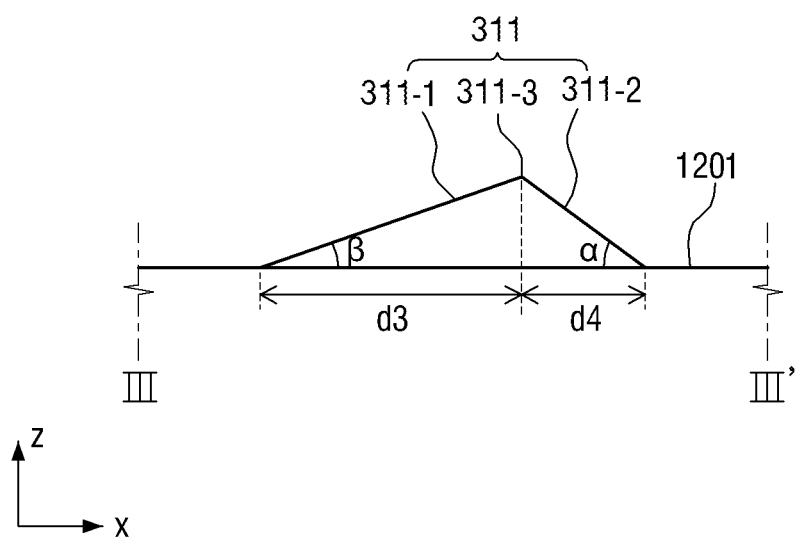
FIG. 54 is a cross-sectional view taken along line of FIG. 52.
Figure 55:
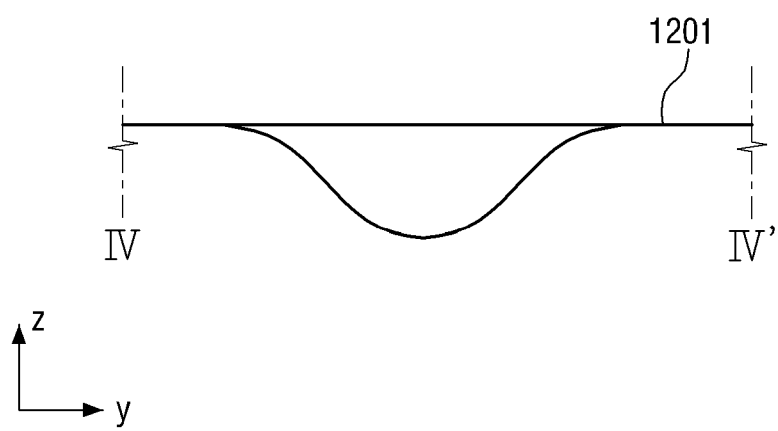
FIG. 55 is a cross-sectional view taken along line IV-IV' of FIG. 52.

FIG. 53 is a partial enlarged view of a diffusion pattern illustrated in FIG. 52, FIG. 54 is a cross-sectional view taken along line of FIG. 52, and FIG. 55 is a cross-sectional view taken along line IV-IV' of FIG. 52.

Referring to FIGS. 53 to 55, a diffusion pattern 311 may include a first inclined surface 311_1 and a first inclined surface 311_2.

The first inclined surface 311_1 and the first inclined surface 311_2 may be disposed side-by-side along the X-axis direction. In the exemplary embodiment illustrated in FIG. 53, unlike in the exemplary embodiment illustrated in FIGS. 57 and 58, the first inclined surface 311_1 may be disposed near the first side surface 130, and the first inclined surface 311_2 may be disposed near the second side surface 140. More specifically, in response to the light source unit 200 being disposed near the first side surface 130, the first inclined surface 311_1 may be disposed nearer than the first inclined surface 311_2 to the light source unit 200.

The first inclined surface 311_1 and the first inclined surface 311_2 may be inclined upwardly from the base surface 1201. More specifically, as illustrated in FIG. 53, the first inclined surface 311_1 and the first inclined surface 311_2 may be inclined upwardly from the base surface 1201, and may then adjoin each other. That is, a boundary portion 311_3 may be provided along the adjoining edges of the first inclined surface 311_1 and the first inclined surface 311_2.

Accordingly, the diffusion pattern 3101 may have a triangular cross-sectional shape in a cross section, and the first inclined surface 311_1 and the first inclined surface 311_2 may provide two sides of the triangular cross-sectional shape.

The first inclined surface 311_1 may define a first inclination angle β with the base surface 1201, and the first inclined surface 311_2 may define a second inclination angle α with the base surface 1201. That is, the first inclination angle β and the second inclination angle α may be two internal angles of the triangular cross-sectional shape illustrated in FIG. 54.

In an exemplary embodiment, the first inclination angle β may be smaller than the second inclination angle α. In the exemplary embodiment, a horizontal distance d3 of the first inclined surface 311_1 may be greater than a horizontal distance d4 of the first inclined surface 311_2.

In an exemplary embodiment, the first inclination angle β may range from about 1.8° to about 5.7°. In the exemplary embodiment, the light guide panel 100 can provide excellent forward-emitted light brightness properties, as already discussed above with reference to FIGS. 49 to 51. In an exemplary embodiment, the second inclination angle α may be, but is not limited to, an acute angle. In an alternative exemplary embodiment, the second inclination angle α may be a right angle.

In an exemplary embodiment, the first inclined surface 311_1 and the second inclined surface 311_2 may be bowtie-shaped in a plan view. That is, the diffusion pattern 311 may be bowtie-shaped in a plan view. For convenience, a side of the first inclined surface 311_1 extending in the Y-axis direction and a side of the second inclined surface 311_2 extending in the Y-axis direction will hereinafter be referred to as a first side 311_1a and a first side 311_2a, respectively, and a pair of sides of the first inclined surface 311_1 extending at an inclination with respect to the X-axis direction and a pair of sides of the second inclined surface 311_2 extending at an inclination with respect to the X-axis direction will hereinafter be referred to as second sides 311_1b and second sides 311_2b, respectively. The first sides 311_1a and 311_2a may be the distal sides of the first and second inclined surfaces 311_1 and 311_2, respectively, from a boundary portion 311_3 between the first and second inclined surfaces 311_1 and 311_2. The first side 311_1a of the first inclined surface 311_1 may be parallel to, and may face, the first side 311_2a of the second inclined surface 311_2. That is, as illustrated in FIG. 53, each of the first inclined surface 311_1 and the second inclined surface 311_2 may be defined by one first side (i.e., 311_1a or 311_2a), two second sides (i.e., 311_1b or 311_2b), and the boundary portion 311_3.

The width of the first inclined surface 311_1 may gradually decrease from the first side 311_1a to the boundary portion 311_3. Similarly, the width of the second inclined surface 311_2 may gradually decrease from the first side 311_2a to the boundary portion 311_3.

In an exemplary embodiment, the second sides 311_1b may connect the first side 311_1a and the boundary portion 311_3, and the second sides 311_2b may connect the first side 311_2a and the boundary portion 311_3. In an exemplary embodiment, the second sides 311_1b and the second sides 311_2b may be straight line-shaped, but the invention is not limited thereto. That is, the second sides 311_1b and the second sides 311_2b may be partially curved.

The second sides 311_1b and the second sides 311_2b may form a predetermined angle with a reference line 1 that extends in the X-axis direction. For convenience, the angle between the second sides 311_1b of the first inclined surface 311_1 and the angle between the second sides 311_2b of the second inclined surface 311_2 will hereinafter be referred to as a first angle θ1 and a second angle θ2, respectively. In an exemplary embodiment, the second sides 311_1b of the first inclined surface 311_1 may form substantially the same angle, i.e., the first angle θ1, with the reference line 1, and the second sides 311_2b of the second inclined surface 311_2 may form substantially the same angle, i.e., the second angle θ2, with the reference line 1.

In an exemplary embodiment, the first angle θ1 may be substantially the same as the second angle θ2, but the invention is not limited thereto.

The first angle θ1 and the second angle θ2 may range from about 1° to about 90°.

The width of the first inclined surface 311_1 or the second inclined surface 311_2 may gradually decrease from the first side 311_1a or 311_2a to the boundary portion 311_3. That is, a width w3 of the first inclined surface 311_1 or the second inclined surface 311_2 at the boundary portion 311_3 may be relatively smaller than a width w1 or w2 of the first inclined surface 311_1 or the second inclined surface 311_2 at the first side 311_1a or 311_2a.

In other words, the first inclined surface 311_1 and the second inclined surface 311_2 may be formed in such a shape that they gradually converge toward the boundary portion 311_3. As already described above, the first side 311_1a of the first inclined surface 311_1 and the first side 311_2a of the second inclined surface 311_2 may face each other, and may extend in parallel to each other. In an exemplary embodiment, a horizontal distance d3 of the first inclined surface 311_1 may be relatively greater than a horizontal distance d4 of the second inclined surface 311_2. In this exemplary embodiment, the width w1 of the first inclined surface 311_1 at the first side 311_1a may be greater than the width w2 of the second inclined surface 311_2 at the first side 311_2a.

The cross section, along line II-II' of FIG. 52, of the diffusion pattern 311 may have an upwardly-curved parabolic shape (refers to FIG. 55). That is, the cross section, along the Y-axis direction, of the diffusion pattern 311 may have an upwardly-curved parabolic shape. In other words, the diffusion pattern 311 may include a protrusion with a curved circumference.

Figure 56:
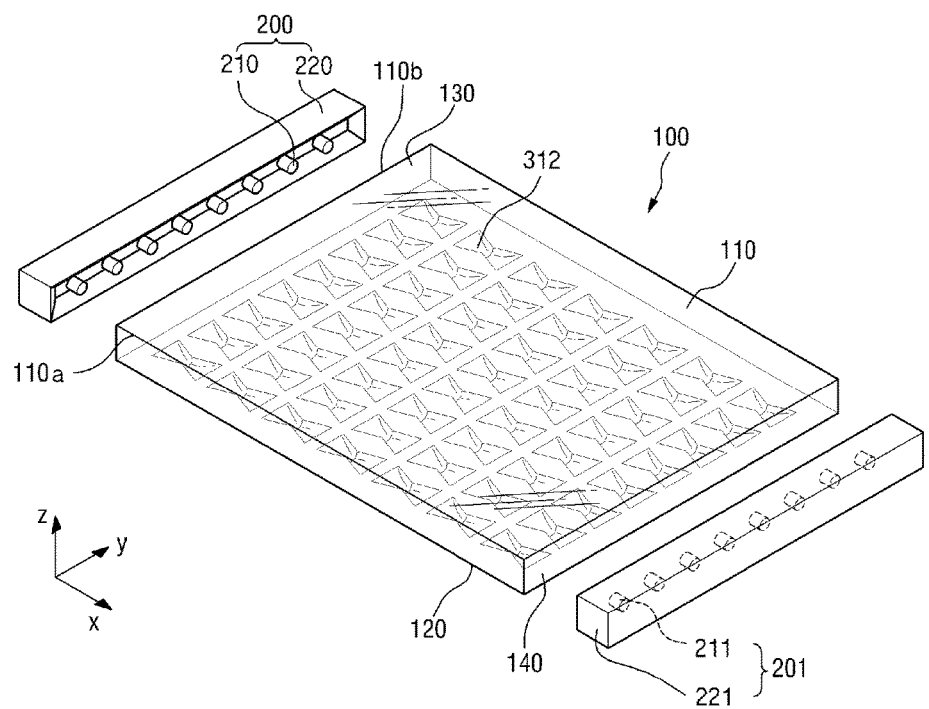
FIG. 56 is a perspective view of another exemplary embodiment of a light guide panel according to the invention.
Figure 57:
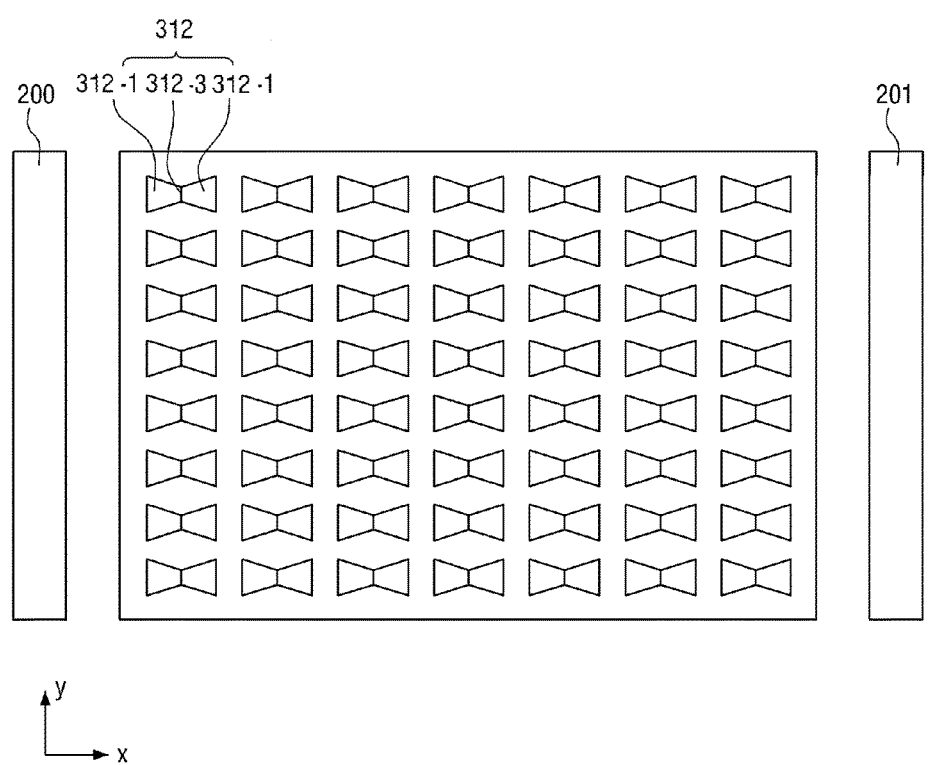
FIG. 57 is a bottom view of a light guide panel illustrated in FIG. 56.
Figure 58:
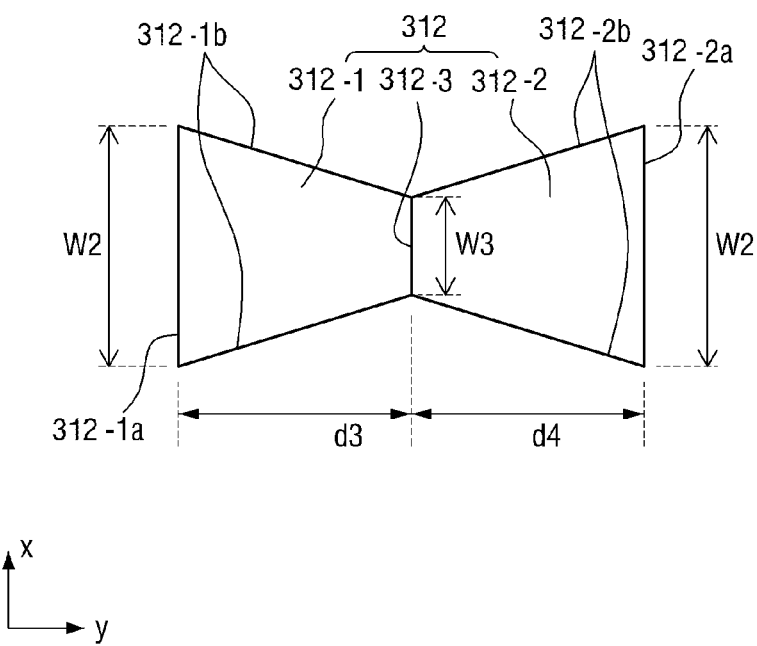
FIG. 58 is a partial enlarged view of the light guide panel illustrated in FIG. 57.
Figure 59:
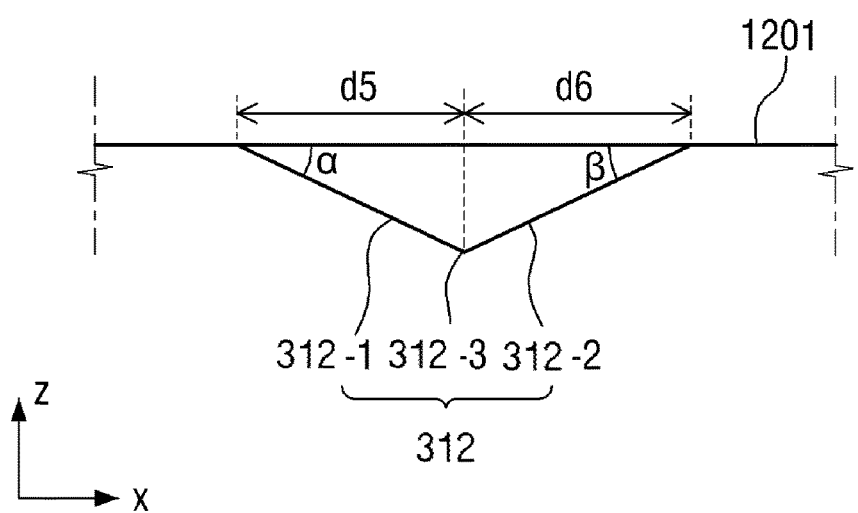
FIG. 59 is a cross-sectional view taken along line V-V' of FIG. 57.

FIG. 56 is a perspective view of another exemplary embodiment of a light guide panel according to the invention, FIG. 57 is a bottom view of a light guide panel illustrated in FIG. 56, FIG. 58 is a partial enlarged view of the light guide panel illustrated in FIG. 57, and FIG. 59 is a cross-sectional view taken along line V-V' of FIG. 57.

Referring to FIGS. 56 to 59, a diffusion pattern 312, unlike its counterpart of FIG. 1, may have a symmetrical shape.

In an exemplary embodiment, a first inclination angle β, which is the angle between a first inclined surface 312_1 with a base surface 1201 may be substantially the same as a second inclination angle α, which is the angle between a second inclined surface 312_2 with the base surface 1201. That is, a horizontal distance d5 of the first inclined surface 312_1 may be substantially the same as a horizontal distance d6 of the second inclined surface 312_2. In other words, as illustrated in FIG. 59, the diffusion pattern 312 may have an isosceles triangular cross-sectional shape in a cross section.

In this exemplary embodiment, a first angle θ1, which is the angle between second sides 312_1b of the first inclined surface 312_1 and a reference line 1, may be substantially the same as a second angle θ2, which is the angle between second sides 312_2b of the second inclined surface 312_2 and the reference line 1. That is, the first inclined surface 312_1 and the second inclined surface 312_2 may be in symmetry in a plan view with respect to a boundary portion 312_3 therebetween.

In this exemplary embodiment, the width of the first inclined surface 312_1 at a first side 312_1a may be substantially the same as the width of the second inclined surface 312_2 at a first side 312_2a.

Figure 60:
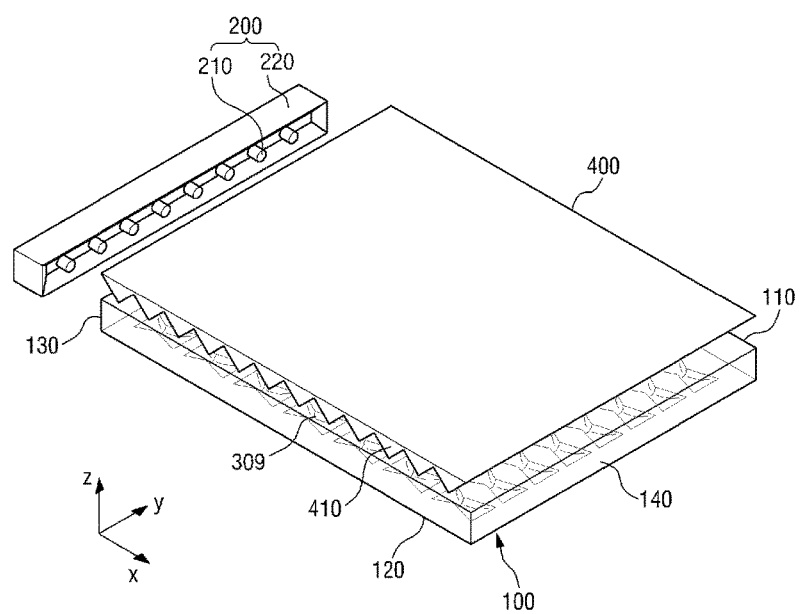
FIG. 60 is a perspective view of an exemplary embodiment of a backlight unit ("BLU") according to the invention.
Figure 61:
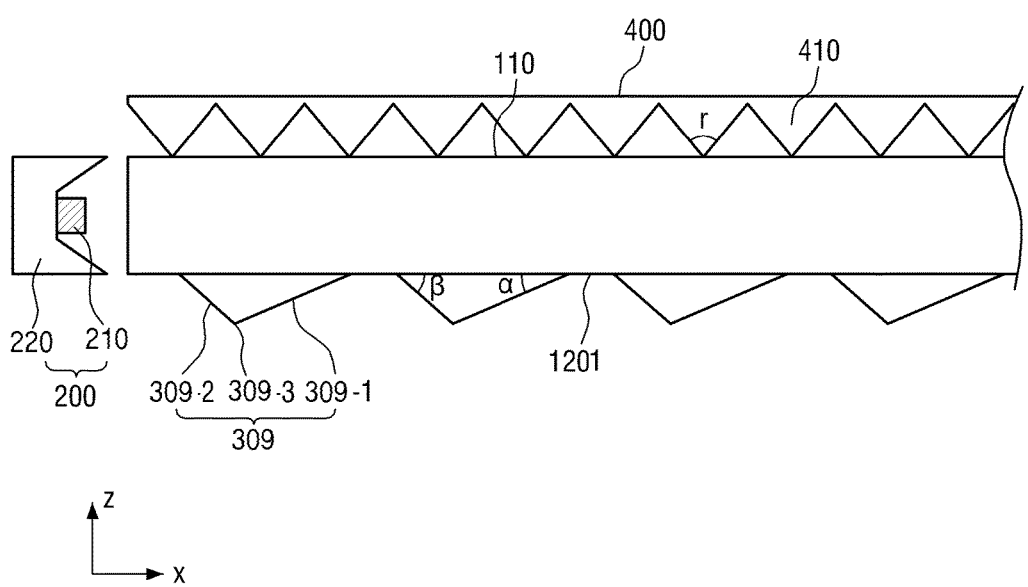
FIG. 61 is a cross-sectional view of the BLU illustrated in FIG. 60.

FIG. 60 is a perspective view of an exemplary embodiment of a backlight unit ("BLU") according to the invention, and FIG. 61 is a cross-sectional view of the BLU illustrated in FIG. 60.

Referring to FIGS. 60 and 61, a BLU includes a light guide panel 100, and the light guide panel 100 includes a top surface 110, which has first and second sides that extend in X- and Y-axis directions, respectively, a bottom surface 120, which is disposed opposite to the top surface 110, and a first side surface 130 and a second side surface 140 which are disposed between the top surface 110 and the bottom surface 120 and face each other, where the bottom surface 120 includes a base surface 120_1 and a plurality of diffusion patterns 309 which is provided to protrude from, or to be recessed into, the base surface 120_1, and each of the diffusion patterns 309 includes a first inclined surface 309_1 which defines a first inclination angle β with the base surface 1201 and a second inclined surface 309_2 which adjoins the first inclined surface 309_1 and defines a second inclination angle α with the base surface 1201. The BLU also includes a light source unit 200 which is disposed near the first side surface 130 of the light guide panel 100, and a prism sheet 400 which is disposed opposite to the top surface 110 of the light guide panel 100 and includes a plurality of prisms 410.

The light guide panel 100 may be substantially identical to its counterparts from the previous exemplary embodiments, and thus, a detailed description thereof will be omitted.

The light source unit 200 may be disposed near the first side surface 130 of the light guide panel 100. The light source unit 200 may include a base 220 which extends in the Y-axis direction and one or more light sources 210 which are disposed on one side of the base 220.

The base 220 may support the light sources 210, and may be provided as a bar extending along the Y-axis direction. In an exemplary embodiment, the base 220 may include sidewalls that at least partially surround the light sources 210.

One or more light sources 210 may be provided on one side of the base 220, i.e., a surface of the base 220 facing the first side surface 130 of the light guide panel 100. In an exemplary embodiment, the light sources 210 may be, but are not limited to, light-emitting diodes ("LEDs").

The light sources 210 may be arranged at regular intervals along the Y-axis direction.

The prism sheet 400 may be disposed on the light guide panel 100. More specifically, the prism sheet 400 may be placed in contact with the top surface 110 of the light guide panel 100 or may be apart from the top surface 110 of the light guide panel 100 with a predetermined distance.

The prism sheet 400 may include a plurality of prisms 410. The prisms 410 may be aligned side-by-side along the X-axis direction, and may extend along the Y-axis direction. That is, the prisms 410, which are bar-shaped in a plan view, may be aligned in parallel to the Y-axis direction.

Each of the prisms 410 may include a mountain-shaped portion in a cross section. The mountain-shaped portions of the prisms 410 may face the top surface 110 of the light guide panel 100. That is, the cross sections, along the X-axis direction, of the prisms 410 have a triangular shape, and the term "mountain-shaped portion", as used herein, may indicate a peak portion of the triangular shape facing the top surface 110 of the light guide panel 100.

In an exemplary embodiment, an inner angle γ of the mountain-shaped portions of the prisms 410 may range from about 60° to about 70°. In an exemplary embodiment, in response to the first inclination angle β being about 3.3°, the internal angle γ of the mountain-shaped portions of the prisms 410 may be about 65°, but the invention is not limited thereto. In another exemplary embodiment, in response to the first inclination angle β being about 2.3°, the internal angle γ of the mountain-shaped portions of the prisms 410 may be about 68°, but the invention is not limited thereto.

Figure 62:
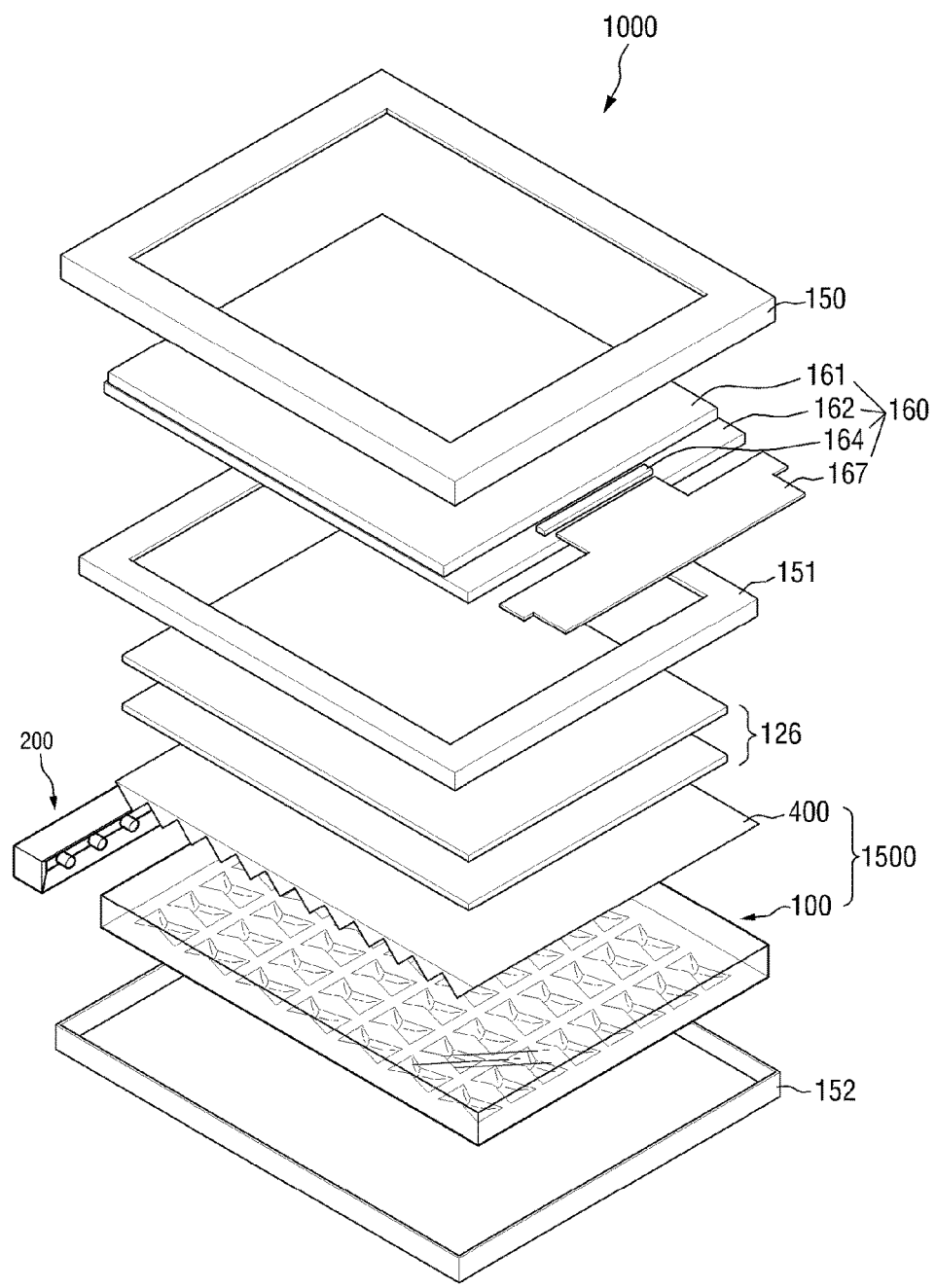
FIG. 62 is an exploded perspective view of an exemplary embodiment of a liquid crystal display ("LCD") according to the invention.

FIG. 62 is an exploded perspective view of an exemplary embodiment of a liquid crystal display ("LCD") according to the invention. Referring to FIG. 62, an LCD 1000 includes a BLU and a display panel 160 disposed on the BLU. The BLU includes a light guide panel 100, and the light guide panel 100 includes a top surface, which has first and second sides that extend in X- and Y-axis directions, respectively, a bottom surface, which is disposed opposite to the top surface, and a first side surface and a second side surface which are disposed between the top surface and the bottom surface and face each other, where the bottom surface includes a base surface and a plurality of diffusion patterns which is provided to protrude from, or to be recessed into, the base surface, and each of the diffusion patterns includes a first inclined surface which defines a first inclination angle β with the base surface and a second inclined surface which adjoins the first inclined surface and defines a second inclination angle with the base surface. The BLU also includes a light source unit 200 which is disposed near the first side surface of the light guide panel 100, and a prism sheet 400 which is disposed opposite to the top surface of the light guide panel 100 and includes a plurality of prisms.

The BLU may be substantially identical to its counterparts from the previous exemplary embodiments, and thus, a detailed description thereof will be omitted.

The LCD 1000 may also include the display panel 160, a top chassis 150 and a bottom chassis 152. The structure of the LCD 1000 will hereinafter be described in further detail.

The display panel 160 may have a display region and a non-display region. The display panel 160 may include a first substrate 161, a second substrate 162 which is disposed opposite to the first substrate 161, a liquid crystal layer (not illustrated), and a driving unit 164 and a printed circuit board ("PCB") 167 which are attached on the first substrate 161.

The display region of the display panel 160 may be a region in which images are displayed, and the non-display region of the display panel 160 may be a region in which no images are displayed. In an exemplary embodiment, the display region may be provided in the middle of the overlapping area of the first substrate 161 and the second substrate 162, and the non-display region may be located along the boundaries of the overlapping area of the first substrate 161 and the second substrate 162. In another exemplary embodiment, the display region may correspond to a portion of the display panel 160 that is not overlapped by the top chassis 150, and the non-display region may correspond to a portion of the display panel 160 that is overlapped by the top chassis 150. The shape of the display region may be similar to the shape of the second substrate 162, and the area of the display region may be smaller than the area of the second substrate 162. The edges of the display region and the edges of the non-display region may be parallel to the sides of the second substrate 162. The boundaries between the display region and the non-display region may provide a rectangular shape.

The first substrate 161 may at least partially overlap the second substrate 162. A central part of the overlapping area of the first substrate 161 and the second substrate 162 may correspond to the display region, and a boundary portion of the overlapping area of the first substrate 161 and the second substrate 162 may correspond to the non-display region. The driving unit 164 and the PCB 167 may be attached onto a portion of the display panel 160 not overlapped by the first substrate 161 and the second substrate 162.

The second substrate 162 may be disposed opposite to the first substrate 161. The liquid crystal layer may be interposed between the first substrate 161 and the second substrate 162. A sealing member (not illustrated) such as a sealant may be disposed along the edges of the first substrate 161 and the second substrate 162 so that the first substrate 161 and the second substrate 162 may be bonded and sealed together.

In an exemplary embodiment, the first substrate 161 and the second substrate 162 may both be rectangular, but are not limited to a rectangular shape. That is, the first substrate 161 and the second substrate 162 may be provided in various shapes, other than a rectangular shape, according to the shape of the display panel 160.

The driving unit 164 may apply various signals (such as a driving signal) for driving an image in the display region. The PCB 167 may output various signals to the driving unit 164.

One or more optical sheets 126, the BLU and the bottom chassis 152 may be disposed on the bottom surface of the display panel 160. More specifically, the optical sheets 126 may be disposed on the BLU, and the bottom chassis 152 may be disposed below the BLU.

The optical sheets 126, which modulate the optical properties of light emitted from the BLU, and a mold frame 151, which accommodates the optical sheets 126 therein, may be disposed on the BLU.

The mold frame 151 may support and fix the display panel 160 by being placed in contact with the edges of the bottom surface of the display panel 160. In an exemplary embodiment, a boundary portion of the bottom surface of the display panel 160 may correspond to the non-display region. That is, the mold frame 151 may at least partially overlap the non-display region of the display panel 160.

The top chassis 150 may cover the edges of the display panel 160 and surround the sides of the display panel 160. The bottom chassis 152 may accommodate the optical sheets 126 and the BLU therein. In an exemplary embodiment, the top chassis 150 and the bottom chassis 152 may both include a conductive material, for example, a metal.

The advantages of the invention will hereinafter be described with reference to FIGS. 20 and 21.

Figure 63:
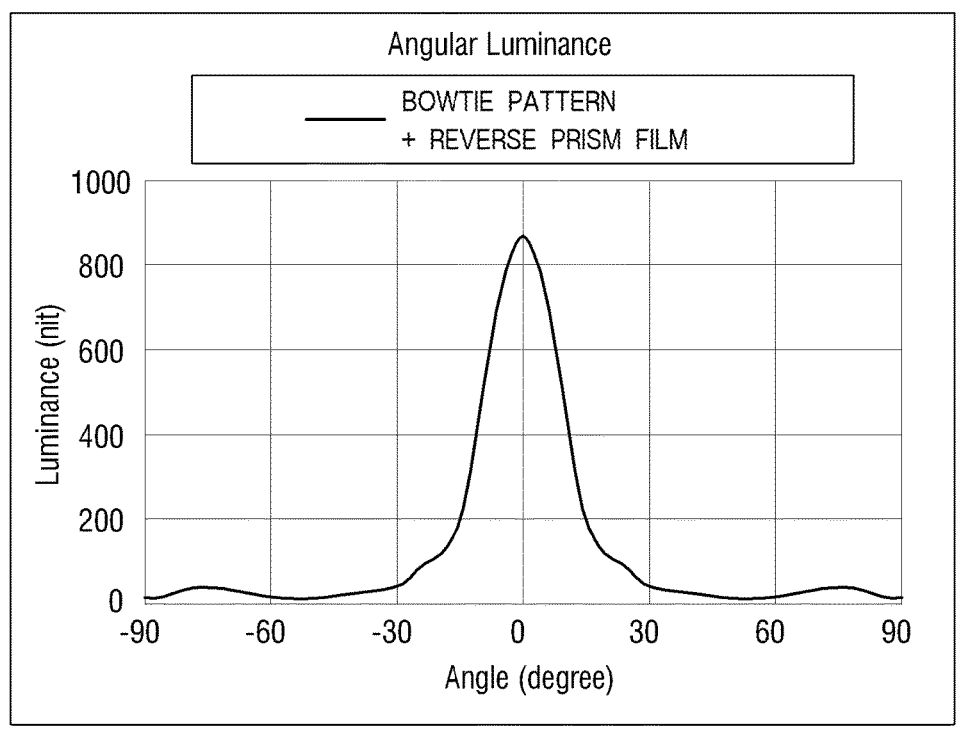
FIG. 63 is a graph illustrating the advantages of the invention.
Figure 64:
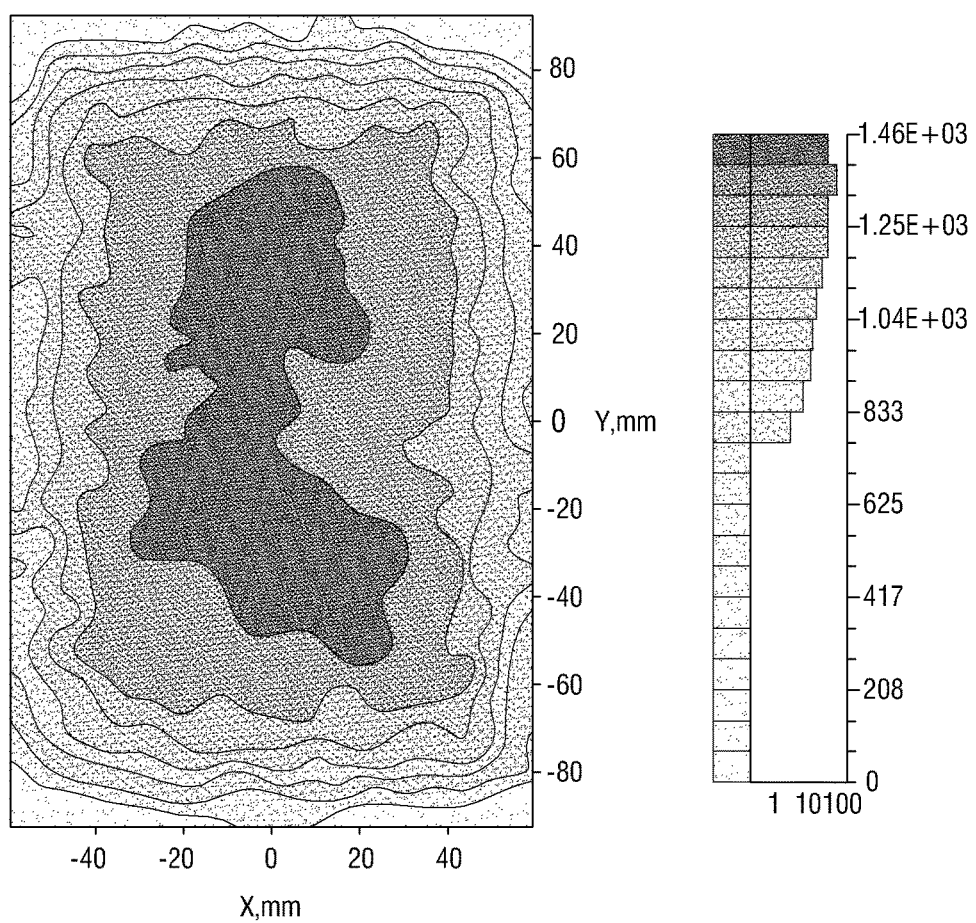
FIG. 64 is a graph illustrating the distribution of luminance according to the invention.

FIG. 63 is a graph illustrating the advantages of the invention, and FIG. 64 is a graph illustrating the distribution of luminance according to the invention.

Referring to FIGS. 63 and 64, according to the invention, the range of focusing angles of a light guide panel can be narrowed (i.e., a maximum level of luminance can be achieved at a focusing angle of about −30° to about 30°), and as a result, the optical efficiency of the light guide panel can be improved. Also, a luminance uniformity of 80% or higher can be achieved. Therefore, a display device with improved display performance can be provided.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A light guide panel, comprising:
a top surface configured to have first and second sides extending in X- and Y-axis directions, respectively; and
a bottom surface configured to be disposed opposite to the top surface, and including:
a base surface; and
a plurality of diffusion patterns which is provided to protrude from or to be recessed from the base surface, each of the plurality of diffusion patterns including a first inclined surface which defines a first inclination angle with the base surface and a second inclined surface which adjoins the first inclined surface and defines a second inclination angle with the base surface,
wherein:
a boundary portion along which the first inclined surface and the second inclined surface adjoin each other is defined;
each of the first inclined surface and the second inclined surface includes a first side extending in the Y-axis direction; and
a width of each of the first inclined surface and the second inclined surface gradually decreases from the first side to the boundary portion.

2. The light guide panel of claim 1, wherein:
each of the first inclined surface and the second inclined surface includes a pair of second sides connecting the first side and the boundary portion;
a reference line that extends in the X-axis direction is defined;
an angle between the second sides of the first inclined surface and the reference line and an angle between the second sides of the second inclined surface and the reference line are defined as a first angle and a second angle, respectively; and
the first angle and the second angle both range from about 1° to 90°.

3. The light guide panel of claim 2, wherein the first angle is the same as the second angle.

4. The light guide panel of claim 2, wherein a width of the first inclined surface at the first side of the first inclined surface and a width of the second inclined surface at the first side of the second inclined surface are greater than a width of the first inclined surface or the second inclined surface at the boundary portion.

5. A backlight unit, comprising:
a light guide panel configured to include:
a top surface having first and second sides extending in X- and Y-axis directions, respectively,
a bottom surface which is disposed opposite to the top surface, and includes:
a base surface; and
a plurality of diffusion patterns which is provided to protrude from or to be recessed from the base surface, each of the plurality of diffusion patterns including a first inclined surface which defines a first inclination angle with the base surface and a second inclined surface which adjoins the first inclined surface and defines a second inclination angle with the base surface, and
a first side surface and a second side surface disposed between the top surface and the bottom surface and facing each other,
wherein
a boundary portion along which the first inclined surface and the second inclined surface adjoin each other is defined;
each of the first inclined surface and the second inclined surface includes a first side extending in the Y-axis direction; and
a width of each of the first inclined surface and the second inclined surface gradually decreases from the first side to the boundary portion;
a light source unit configured to be disposed near the first side surface of the light guide panel; and
a prism sheet which is configured to be disposed on the light guide panel and includes a plurality of prisms facing the top surface of the light guide panel.

6. The backlight unit of claim 5, wherein:
each of the first inclined surface and the second inclined surface includes a pair of second sides connecting the first side and the boundary;
a reference line that extends in the X-axis direction is defined;
an angle between the second sides of the first inclined surface and the reference line and an angle between the second sides of the second inclined surface and the reference line are defined as a first angle and a second angle, respectively; and
the first angle and the second angle both range from about 1° to 90°.

7. The backlight unit of claim 6, wherein a width of the first inclined surface at the first side of the first inclined surface and a width of the second inclined surface at the first side of the second inclined surface are greater than a width of the first inclined surface or the second inclined surface at the boundary.

* * * * *